United States Patent
Dai et al.

(10) Patent No.: US 12,428,537 B2
(45) Date of Patent: Sep. 30, 2025

(54) COMPOSITE CONDUCTIVE AGENT, PREPARATION METHOD THEREOF, SECONDARY BATTERY, AND ELECTRICAL DEVICE

(71) Applicant: CONTEMPORARY AMPEREX TECHNOLOGY (HONG KONG) LIMITED, Hong Kong (CN)

(72) Inventors: Zhipeng Dai, Ningde (CN); Miaomiao Ren, Ningde (CN); Xianwei Yang, Ningde (CN); Yang Lu, Ningde (CN); Xin Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/531,485

(22) Filed: Dec. 6, 2023

(65) Prior Publication Data

US 2024/0166842 A1    May 23, 2024

Related U.S. Application Data

(63) Continuation of application No. PCT/CN2022/129031, filed on Nov. 1, 2022.

(51) Int. Cl.
    *C08K 3/04*      (2006.01)
    *C08F 290/06*    (2006.01)
(52) U.S. Cl.
    CPC .......... *C08K 3/041* (2017.05); *C08F 290/062* (2013.01); *C08K 2201/001* (2013.01)
(58) Field of Classification Search
    CPC .................................................... C08K 3/041
    See application file for complete search history.

(56) References Cited

U.S. PATENT DOCUMENTS

| 2007/0215841 A1* | 9/2007 | Ford | H01J 9/025 |
| | | | 252/502 |
| 2015/0050554 A1* | 2/2015 | Fukumine | H01M 4/0416 |
| | | | 252/182.1 |

FOREIGN PATENT DOCUMENTS

| CN | 103199257 A | 7/2013 |
| CN | 109461937 A | 3/2019 |

(Continued)

OTHER PUBLICATIONS

The European Patent Office (EPO) The Extended European Search Report for Application No. 22938764.2 Nov. 29, 2024 10 Pages.

(Continued)

*Primary Examiner* — William D Young
(74) *Attorney, Agent, or Firm* — ANOVA LAW GROUP, PLLC

(57) ABSTRACT

A composite conductive agent includes an organic polymer, and a hydroxylated carbon nanotube combined with the organic polymer. The organic polymer includes a polymer having a structural formula represented by formula (1),

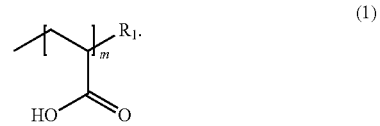

In the formula (1), m is an integer ranging from 2500 to 20000, and $R_1$ is a polymer structure including an ester group and a nitrile group.

19 Claims, 2 Drawing Sheets

(56) References Cited

FOREIGN PATENT DOCUMENTS

| | | |
|---|---|---|
| CN | 110233235 A | 9/2019 |
| CN | 113078317 A | 7/2021 |
| KR | 20080030699 A | 4/2008 |

OTHER PUBLICATIONS

Zhen-Gang Wang et al., "Covalent immobilization of redox enzyme on electrospun nonwoven poly(acrylonitrile-co-acrylic acid) nanofiber mesh filled with carbon nanotubes: A comprehensive study." Biotechnology and bioengineering 97.4 (2007): 708-720.
Cen L et al. "Soap-free styrene-acrylic/carbon nanotubes composite latex by in situ emulsion polymerization: Preparation, properties and characterizations." Surfaces and Interfaces 25 (2021): 101204.
The World Intellectual Property Organization (WIPO) International Search Report for PCT/CN2022/129031 6 Pages (including translation) Jul. 19, 2023.

* cited by examiner

COMPOSITE CONDUCTIVE AGENT, PREPARATION METHOD THEREOF, SECONDARY BATTERY, AND ELECTRICAL DEVICE

CROSS-REFERENCE TO RELATED APPLICATION

This application is a continuation of International Application No. PCT/CN2022/129031, filed on Nov. 1, 2022, the entire content of which is incorporated herein by reference.

TECHNICAL FIELD

The application relates to the technical field of electrochemistry, and more particularly to a composite conductive agent, a preparation method thereof, a secondary battery, and an electrical device.

BACKGROUND

In recent years, secondary batteries, represented by lithium-ion batteries, have become more and more extensively applied. Secondary batteries are widely used in energy storage power systems, such as hydraulic, thermal, wind, and solar power plants, as well as power tools, electric bicycles, electric motorcycles, electric vehicles, military equipment, aerospace, and other fields. Due to the great development of secondary batteries, higher requirements have been imposed on the energy density, cycle performance, and safety performance. However, the current secondary batteries represented by traditional lithium-ion batteries generally have the problem of low cycle life due to the expansion of the battery cells during the cycle process, which cannot meet the actual use requirements.

SUMMARY

It is one of objectives of the present applications to provide a composite conductive agent, a preparation method thereof, a secondary battery, and an electrical device, which can improve the cycle life of the secondary battery.

In order to achieve the above objectives, a first aspect of the present application provides a composite conductive agent, comprising: an organic polymer, and a hydroxylated carbon nanotube combined with the organic polymer.

The organic polymer comprises a polymer having a structural formula represented by formula (1),

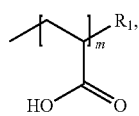
(1)

in the formula (1), m is an integer ranging from 2500 to 20000, and $R_1$ is a polymer structure comprising an ester group and a nitrile group.

In embodiments of the present application, the composite conductive agent comprises an organic polymer and a hydroxylated carbon nanotube combined with the organic polymer. The organic polymer comprises a linear polymerization structure shown in the above formula (1), the hydroxylated carbon nanotube also has a linear structure, and the composite conductive agent formed by combining the organic polymer and the hydroxylated carbon nanotube can fully realize linear polymerization. Therefore, when the composite conductive agent is used as an additive to prepare the electrode plate slurry, compared with the traditional acrylic binder, the composite conductive agent can give full play to the coating effect of linear polymerization, enhance the bonding and binding effect on other particulate matter in the slurry (for example, silicon-based active material particles), improve the inhibition effect on the volume expansion of other particulate matter (especially silicon-based active material particles) during the cycle, reduce the rebound of the electrode plate, reduce the expansion force during the cycle of the battery cell, and improve the cycle life of the battery cell.

In some embodiments of the present application, the polymer structure comprises a polymer structure represented by formula (2), the polymer structure comprises a polymer structure having a structural formula represented by formula (2),

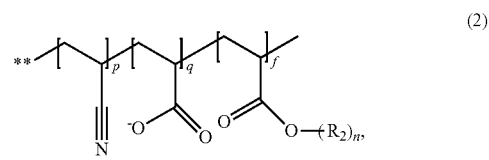
(2)

in the formula (2), ** represents a connection site of the polymer structure, p is an integer ranging from 1000 to 5000, q is an integer ranging from 1000 to 15000, f is an integer ranging from 500 to 4000, $2 \leq n \leq 200$, each $R_2$ is independently one selected from

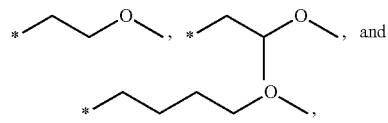

* represents a connection site of $R_2$, and $M^+$ is one selected from Na+, $K^+$, $Li^+$ and $NH_4^+$.

Compared with the traditional single-type monomer linear polymer, in the composite conductive agent of the present application, the linear structure of the molecular chain contains relatively many branched chains formed by a variety of different functional groups. These branched chains can reduce the brittleness of the composite conductive agent and enhance the flexibility thereof, thereby enhancing the flexibility of the electrode plate. Thus, after cold pressing with high compaction density, the ductility of the electrode plate can be improved, this can effectively reduce the occurrence of edge over-stress. In addition, the phenomenon of easy occurrence of the brittle fracture of the electrode plate under high compaction density during subsequent processing can also be reduced, and the machinability of the electrode plate can be improved.

In some embodiments of the present application, the composite conductive agent satisfies at least one of the following conditions:

(1) the hydroxylated carbon nanotube is combined with the organic polymer through an ester group and/or a hydrogen bond, optionally, the hydroxylated carbon nanotube is combined with the organic polymer through an ester group; and (2) at least one hydroxyl group is attached to a surface of the hydroxylated carbon nanotube.

After the ester group is formed between the hydroxylated carbon nanotube and the organic polymer, the carboxyl functional group in the organic polymer can be reduced, thereby reducing the hydrogen bond between molecules in the long chains of the polymer, effectively reducing the mutual aggregation between the long chains of the polymer, improving the uniformity of dispersion in the slurry, reducing the resistance of the electrode plate, and improving the kinetic performance of the battery cell.

In some embodiments of the present application, the composite conductive agent satisfies at least one of the following conditions:

(1) in the composite conductive agent, a weight percentage content of the organic polymer is 50% to 90%, optionally 65% to 80%;

(2) in the composite conductive agent, a weight percentage content of the hydroxylated carbon nanotubes is 10% to 50%, optionally 20% to 35%; and (3) the hydroxylated carbon nanotube comprises a hydroxylated single-walled carbon nanotube and/or a hydroxylated multi-walled carbon nanotube.

The weight percentage content of the organic polymer in the composite conductive agent is in an appropriate range, which can not only provide a sufficient linear polymer structure for the composite conductive agent, give full play to the performance of the organic polymer, improve the cycle life of the battery cell and the machinability of the electrode plate; but also ensure that the composite conductive agent has high conductivity. The weight percentage content of hydroxylated carbon nanotubes in the composite conductive agent is within an appropriate range, which can not only ensure that the composite conductive agent has high conductivity, but also allow a sufficient number of ester groups to be formed between the organic polymer and the hydroxylated carbon nanotubes, thereby effectively reducing the carboxyl functional groups in the organic polymer, reducing the agglomerations formed by the hydrogen bonds between the long chains of the polymer, improving the uniformity of dispersion, and improving the kinetic performance of the battery cell.

A second aspect of the present application provides a method for preparing a composite conductive agent, comprising:

enabling acrylate and acrylic acid to react with a hydroxylated carbon nanotube to obtain a pre-reacted mixture; and polymerizing the pre-reacted mixture with acrylonitrile and a polyether polyol monoacrylate to form an organic polymer combined with the hydroxylated carbon nanotube, thereby obtaining a composite conductive agent, in which, the composite conductive agent comprises the organic polymer and the hydroxylated carbon nanotube, and the organic polymer has a structural formula represented by formula (1),

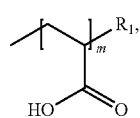

(1)

in the formula (1), m is an integer ranging from 2500 to 20000, and $R_1$ is a polymer structure comprising an ester group and a nitrile group.

In the method provided in the present application, by enabling acrylate and acrylic acid to pre-react with the hydroxylated carbon nanotube, the pre-polymerization of acrylate and acrylic acid with the hydroxylated carbon nanotube can be realized, such that a part of acrylate and acrylic acid to form oligomers through pre-polymerization, and at the same time a part of the hydroxylated carbon nanotubes are enabled to be grafted to the oligomers through esterification, thereby obtaining a pre-reacted mixture. Then the pre-reacted mixture is polymerized with acrylonitrile and polyether polyol monoacrylate to achieve linear polymerization of the pre-reacted mixture, acrylonitrile and polyether polyol monoacrylate to form an organic polymer having the structural formula represented by formula (1), and more hydroxylated carbon nanotubes are grafted onto the organic polymer through the esterification reaction, so as to combine with the organic polymer to obtain a composite conductive agent. Polyacrylic acid and polyacrylonitrile formed after the polymerization of acrylic acid and acrylonitrile have good bonding effects, and such bonding effect can be further enhanced after polyacrylic acid and polyacrylonitrile are polymerized, which is conducive to giving full play to the coating effect of linear polymerization, enhancing the bonding and binding effect on other particulate matter in the slurry (for example, silicon-based active material particles), improving the inhibition effect on the volume expansion of other particulate matter (especially silicon-based active material particles) during the cycle, reducing the rebound of the electrode plate, reducing the expansion force during the cycle of the battery cell, and improving the cycle life of the battery cell.

In some embodiments of the present application, the step of enabling acrylate and acrylic acid to react with a hydroxylated carbon nanotube comprises:

contacting the acrylate and the acrylic acid with the hydroxylated carbon nanotube for reaction, under the action of a polymerization aid.

In some embodiments of the present application, the method satisfies at least one of the following conditions:

(1) the acrylate comprises at least one of sodium acrylate, potassium acrylate, lithium acrylate, and ammonium acrylate; and (2) the polymerization aid comprises sodium dodecylsulfonate and/or sodium dodecyl sulfate.

While acts as a surfactant, the polymerization aid can also break the intramolecular and intermolecular hydrogen bonds, which is beneficial to promote the prepolymerization reaction.

In some embodiments of the present application, the step of contacting the acrylate and the acrylic acid with the hydroxylated carbon nanotube for reaction, under the action of a polymerization aid comprises:

contacting and mixing the polymerization aid, the acrylate, the acrylic acid, with the hydroxylated carbon nanotube in water to form a first mixed solution; and performing a first heat treatment on the first mixed solution, to subject the acrylate, the acrylic acid, and the hydroxylated carbon nanotube with a prepolymerization reaction.

After the first heat treatment is performed on the first mixed solution formed by the polymerization aid, acrylate, acrylic acid and the hydroxylated carbon nanotube, a part of the acrylate and a part of acrylic acid can be prepolymerized to form the oligomer. At the same time, a part of the hydroxylated carbon nanotube can be grafted onto the oligomer through esterification to obtain the pre-reacted mixture.

In some embodiments of the present application, the method satisfies at least one of the following conditions:
(1) in the first mixed solution, a weight percentage content of the acrylate is 3% to 25%, optionally 5% to 15%;
(2) in the first mixed solution, a weight percentage content of the acrylic acid is 5% to 40%, optionally 15% to 25%;
(3) in the first mixed solution, a weight percentage content of the hydroxylated carbon nanotube is 1% to 10%, optionally 3% to 7%;
(4) in the first mixed solution, a weight percentage content of the polymerization aid is 2% to 5%, optionally 3% to 4.5%; and
(5) a temperature of the first heat treatment is 50° C. to 85° C., optionally 65° C. to 80° C.

The weight percentage content of each component in the first mixed solution is within an appropriate range, which can improve the dispersion uniformity and improve the kinetic performance of the battery cell, as well as make the composite conductive agent have high bonding property.

In some embodiments of the present application, the step of polymerizing the pre-reacted mixture with acrylonitrile and a polyether polyol monoacrylate comprises:
contacting and polymerizing the pre-reacted mixture with the acrylonitrile and the polyether polyol monoacrylate, under the action of a polymerization initiator, to form the polymer structure, wherein the polymer structure comprises a polymer structure having a structural formula represented by formula (2),

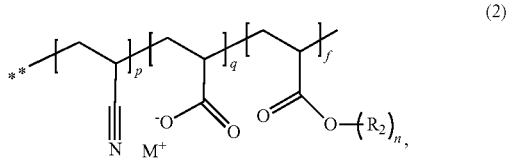

(2)

in the formula (2), ** represents a connection site of the polymer structure, p is an integer ranging from 1000 to 5000, q is an integer ranging from 1000 to 15000, f is an integer ranging from 500 to 4000, $2 \leq n \leq 200$, each $R_2$ is independently one selected from

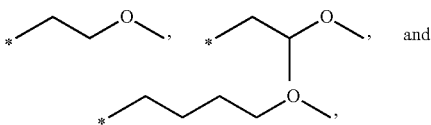

* represents a connection site of $R_2$, and $M^+$ is one selected from Na+, $K^+$, $Li^+$ and $NH_4^+$.

Polymerization under the action of a polymerization initiator is favorable for initiating and promoting the progress of the polymerization reaction, forming the above polymerization structure having the structure formula represented by formula (2), and obtaining the organic polymer.

In some embodiments of the present application, the method satisfies at least one of the following conditions:
(1) the polyether polyol monoacrylate comprises at least one of a polyethylene glycol acrylate, a polypropylene glycol acrylate, and a polytetrahydrofuran glycol acrylate; and (2) the polymerization initiator comprises at least one of potassium sulfate, potassium persulfate, and sodium persulfate.

Selection of a suitable type of polyether polyol monoacrylate can promote the polymerization reaction, and obtain the polymer structure of poly(polyether polyol monoacrylate) in the organic polymer.

In some embodiments of the present application, the step of contacting and polymerizing the pre-reacted mixture with the acrylonitrile and the polyether polyol monoacrylate under the action of a polymerization initiator comprises:
contacting and mixing the polymerization initiator, the acrylonitrile, and the polyether polyol monoacrylate in a solution of the pre-reacted mixture to obtain a second mixed solution; and
performing a second heat treatment on the second mixed solution, to subject the acrylonitrile, the polyether polyol monoacrylate, and the pre-reacted mixture with a polymerization reaction.

Polymerizing the pre-reacted mixture with acrylonitrile and polyether polyol monoacrylate can realize the linear polymerization of the pre-reacted mixture, acrylonitrile and polyether polyol monoacrylate to form an organic polymer, and allow more hydroxylated carbon nanotubes to graft onto the organic polymer through esterification, thereby combining with the organic polymer to obtain a composite conductive agent.

In some embodiments of the present application, the method satisfies at least one of the following conditions:
(1) in the second mixed solution, a weight percentage content of the polymerization initiator is 1% to 3%, optionally 2% to 2.5%;
(2) in the second mixed solution, a weight percentage content of the acrylonitrile is 5% to 30%, optionally 10% to 20%;
(3) in the second mixed solution, a weight percentage content of the polyether polyol monoacrylate is 10% to 40%, optionally 20% to 35%; and
(4) a temperature of the second heat treatment is 50° C. to 85° C., optionally 70° C. to 80° C.

The weight percentage content of polyether polyol monoacrylate in the second mixed solution is controlled within an appropriate range, which is conducive to the formation of organic polymers and the obtaining of the polymer structure of the poly(polyether polyol monoacrylate) with a corresponding polymerization degree in the organic polymer, so that the electrode plate has better flexibility, prevents brittle fracture, can withstand deformation during processing, and can also withstand deformation caused by volume changes during battery cycles, thereby improving the service life.

In some embodiments of the present application, the method further comprises a step of preparing the polyether polyol monoacrylate, comprising:
contacting acrylic acid with a polyether polyol for esterification reaction, whereby obtaining the polyether polyol monoacrylate.

Polyether polyol monoacrylate can be obtained by esterification of acrylic acid and polyether polyol. The ether bond contained in the polyether polyol monoacrylate can effectively enhance the flexibility of the composite conductive agent in the finally obtained composite conductive agent, thereby enhancing the flexibility of the electrode plate and improving the machinability of the electrode plate.

In some embodiments of the present application, the method satisfies at least one of the following conditions:

(1) the polyether polyol comprises at least one of a polyethylene glycol, a polypropylene glycol, and a polytetrahydrofuran glycol; and
(2) a polymerization degree of the polyether polyol is 2 to 200, optionally 50 to 150.

The polymerization degree of the polyether polyol is mainly represented by the length of the side chain. A suitable polymerization degree can improve the problem that the linear structure of the main chain causes the electrode plate brittle, while too long the main chain will easily lead to decreased bonding property and slurry processing problems.

In some embodiments of the present application, the step of contacting acrylic acid with a polyether polyol for esterification reaction comprises:
contacting and mixing the acrylic acid and the polyether polyol in water to form a third mixed solution; and
performing a third heat treatment on the third mixed solution to obtain a solution of the polyether polyol monoacrylate.

In the above steps, acrylic acid and the polyether polyol can be subjected to esterification reaction under the action of the catalyst and the polymerization inhibitor. The esterification reaction can make the carboxyl group in acrylic acid and the hydroxyl group in polyether polyol link to form polyether polyol monoacrylate.

In some embodiments of the present application, the method satisfies at least one of the following conditions:
(1) a molar ratio of the acrylic acid to the polyether polyol is (5:1) to (1:1), optionally (1.5:1) to (2.5:1); and
(2) a temperature of the third heat treatment is 50° C. to 85° C., optionally 65° C. to 80° C.

The molar ratio of acrylic acid and the polyether polyol is controlled in an appropriate range, which is conducive to the occurrence of esterification, so as to obtain the polyether polyol monoacrylate as the target product.

In some embodiments of the present application, before performing the third heat treatment on the third mixed solution, the method further comprises: adding a catalyst and a polymerization inhibitor to the third mixed solution;
optionally, the catalyst comprises at least one of p-toluenesulfonic acid, sulfuric acid, and aluminum oxide; and
optionally, the polymerization inhibitor comprises at least one of hydroquinone, p-hydroxyanisole, and 2,6-di-tert-butyl-p-cresol.

A suitable type of catalyst can play a better catalytic role in the esterification reaction and increase the rate of the reaction. A suitable type of polymerization inhibitor can prevent the polymerization of acrylic acid monomers in the esterification reaction.

In some embodiments of the present application, the method satisfies at least one of the following conditions:
(1) in the third mixed solution, a weight percentage content of the catalyst is 3% to 10%, optionally 5% to 9%; and
(2) in the third mixed solution, a weight percentage content of the polymerization inhibitor is 1% to 5%, optionally 3% to 4.5%.

The weight percentage content of the catalyst in the third mixed solution is in an appropriate range, so that the catalyst can play a better role in catalytic promotion. The weight percentage content of the polymerization inhibitor in the third mixed solution is in an appropriate range, so that the polymerization inhibitor can better prevent the polymerization of the acrylic acid monomer.

In some embodiments of the present application, after performing the third heat treatment on the third mixed solution, the method further comprises:
purifying the solution of the polyether polyol monoacrylate to obtain the polyether polyol monoacrylate.

The purification of the solution of polyether polyol monoacrylate can remove impurities in the reaction, so as to obtain the polyether polyol monoacrylate as the target product.

In some embodiments of the present application, the method further comprises a step of preparing the acrylate, which comprises:
contacting acrylic acid with an alkaline reagent for reaction, to obtain the acrylate.

Acrylic acid is salified by reacting acrylic acid with an alkaline reagent to obtain an acrylate. By salifying the carboxylic acid functional group in acrylic acid, the hydrogen bond on the polyacrylate molecular chain during the subsequent polymerization reaction can be reduced, and the mutual aggregation between the molecular chains can be weakened, so that the final conductive binder can be evenly dispersed in the slurry, thereby improving the kinetic performance of the battery.

In some embodiments of the present application, the step of contacting acrylic acid with an alkaline reagent for reaction comprises:
adding the alkaline reagent to a solution of acrylic acid to enable a pH value of a resulting solution to be 7 to 8, whereby obtaining a solution of the acrylate; and
performing distillation and drying on the solution of the acrylate.

By controlling the pH value of the solution, the amount of the reactants acrylic acid and alkaline reagent can be controlled indirectly, and by controlling the amount of the reactants within appropriate ranges, the occurrence of the salification reaction is facilitated, thereby obtaining the target product acrylate.

In some embodiments of the present application, the method satisfies at least one of the following conditions:
(1) the alkaline reagent comprises at least one of sodium hydroxide, potassium hydroxide, lithium hydroxide, and ammonia water; and
(2) the acrylate comprises at least one of sodium acrylate, potassium acrylate, lithium acrylate, and ammonium acrylate.

Acrylate can participate the polymerization reaction in the subsequent process, to yield a polymer structure of the polyacrylate in the organic polymer; the alkaline reagent can salify the acrylic acid to reduce the carboxyl group contained in the acrylic acid.

The third aspect of the present application provides a secondary battery, comprising the composite conductive agent as described in the first aspect of the present application or the composite conductive agent prepared by the method as described in the second aspect of the present application.

The fourth aspect of the present application provides an electrical device, comprising the secondary battery as described in the third aspect of the present application.

The electrical device of the present application comprises the secondary battery provided by the present application, and thus has at least the same advantages as the secondary battery.

The details of one or more embodiments of the present application are set forth in the accompanying drawings and the description below. Other features, objects, and advan-

DETAILED DESCRIPTION

Figure 1:
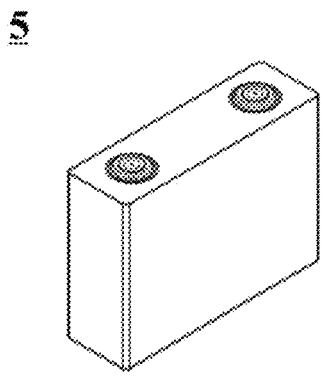
FIG. 1 is a schematic diagram of an embodiment of a secondary battery of the present application.

In order to make the purpose, technical solutions, and advantages of the present application clearer, the technical solutions of the present application will be clearly and completely described below in conjunction with the embodiments. Obviously, the described embodiments are only a part, rather than all, of the embodiments of the present application. The relevant embodiments described herein are illustrative in nature and are used to provide a basic understanding of the present application. The embodiments of the present application should not be construed as limiting the present application.

For brevity, only some numerical ranges are specifically disclosed herein. However, any lower limit may be combined with any upper limit to form an unspecified range; and any lower limit may be combined with other lower limits to form an unspecified range; likewise, any upper limit may be combined with any other upper limit to form an unspecified range. Furthermore, each individually disclosed point or individual value may itself be used as a lower or upper limit in combination with any other point or individual value or in combination with other lower or upper limits to form unspecified ranges.

In the description herein, unless otherwise specified, "above" and "below" include the number itself.

Unless otherwise specified, terms used in the present application have a well-known meaning as commonly understood by those skilled in the art. Unless otherwise specified, the values of each parameter mentioned in the present application can be measured by various measurement methods commonly used in the art (for example, tests can be performed according to the methods given in the embodiments of the present application).

A list of items to which the terms "at least one member of", "at least one of", "at least one type of", or other similar terms are connected may mean any combination of the listed items. For example, if items A and B are listed, then the phrase "at least one of A and B" means only A; only B; or A and B. In another example, if items A, B, and C are listed, then the phrase "at least one of A, B, and C" means only A; only B; only C; A and B (excluding C); A and C (excluding B); B and C (excluding A); or all of A, B, and C. Item A may contain a single component or multiple components. Item B may contain a single component or multiple components. Item C may contain a single component or multiple components.

At present, in order to meet the market demand, the energy density of secondary batteries represented by lithium-ion batteries becomes higher and higher. In such condition, the battery cell design requires that the electrode plates need to have high coating surface density and high compaction density. In addition, in order to improve energy density, silicon-based materials are also introduced in the selection of active materials for secondary batteries. During the research process, the inventors found that silicon-based materials will produce volume expansion during the cycle of the secondary battery. In addition, accompanied by the conditions of high coating surface density and high compaction density, the rebound of the electrode plate in the direction perpendicular to the plane (Z direction) will continue to accumulate, which, in the short term, will affect the amount of active material entering the shell, thereby affecting the capacity of the secondary battery; and which, in the long term, will lead to excessive expansion of the battery cell due to the rebound of the electrode plate, thereby affecting the cycle life of the secondary battery.

In addition, traditional secondary batteries represented by lithium-ion batteries generally use organic polymers as binders. Compared with other types of binders, polyacrylic acid polymers, as a single-type of monomeric linear polymer, are more widely used in secondary batteries due to their high bonding property and chemical stability. However, inventors found in the course of research that although the overall performance of polyacrylic polymers is better than other similar binders, when simply using polyacrylic polymers as binders, the long polymer chains will agglomerate with each other due to the intermolecular hydrogen bonding on the long polymer chains during use. It is difficult to effectively disperse the binder in the slurry, which eventually leads to an increase in the resistance of the electrode sheet, an increase in the DC resistance (DCR) of the battery cell, and lithium precipitation and other phenomena, thus deterioration of the kinetic performance.

In addition, the inventors also found that although polyacrylic acid polymers have excellent bonding property, the conductivity thereof is poor; moreover, the single-type of monomeric linear polymers are generally brittle due to the relatively simple type of functional groups, and are usually in contact with other particulate matter in the slurry in the form of network surface contact. After the slurry is coated on the current collector to form an electrode plate, the linear structure of the polyacrylic acid polymer molecular chain will make the electrode plate less flexible. After cold pressing with a high compaction density, the ductility of the electrode plate will be insufficient, and the stress will be easily concentrated on the edge of the film coated area, resulting in edge over-stress. In addition, the electrode plate under high compaction density is prone to brittle fracture during subsequent processing, resulting in poor machinability of the electrode plate.

Furthermore, in the process of pursuing high energy and high power density in secondary batteries represented by lithium-ion batteries, linear CNTs (carbon nanotubes) have become the main additives in the cathode and anode slurry formulations due to their high conductivity. However, the inventors found that during the preparation of the slurry containing linear CNTs, the linear CNTs will produce crosslinking, which will cause the CNTs to entangle in the slurry, resulting in uneven dispersion of the slurry, and even gelation, thereby affecting the machinability of the electrode plate.

In order to solve the above problems, the inventors started from the linear polymer binder and the linear CNT conductive agent, and proposed a composite conductive agent through extensive research, comprising organic polymers and hydroxylated carbon nanotubes combined with organic polymers. The composite conductive agent can form a composite product of an organic polymer and a hydroxylated CNT (carbon nanotube) by combining an organic polymer with a hydroxylated carbon nanotube. During slurry processing, the long-chain molecules of the organic polymer can be suspended in the aqueous solution to stabilize other particulate matter in the slurry, thereby improving the thickening and stabilizing effect of the composite conductive agent, improving the distribution of hydroxylated CNT in the slurry, and improving the uniformity of dispersion. In addition, after the organic polymer is combined with the hydroxylated CNT, the high conductivity of the hydroxylated CNT can also improve the conductivity of the organic polymer, thereby obtaining a composite conductive agent composite product with better comprehensive performance. In addition, the organic polymer and hydroxylated CNT in the composite conductive agent also fully realize the linear polymerization, which can give full play to the coating effect of linear polymerization, enhance the coating effect of the composite conductive agent in the slurry on other particulate matter, improve the effect of inhibiting the expansion of silicon-based materials during the cycle, reduce the rebound of the electrode plate, reduce the expansion force during the cycle of the battery cell, and improve the cycle life of the battery cell.

Composite Conductive Agent

A first aspect of the embodiments of the present application provides a composite conductive agent, comprising an organic polymer and a hydroxylated carbon nanotube combined with the organic polymer. The organic polymer comprises a polymer having a structural formula represented by formula (1),

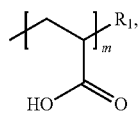

in the formula (1), m is an integer ranging from 2500 to 20000, and $R_1$ is a polymer structure comprising an ester group and a nitrile group.

In embodiments of the present application, the composite conductive agent comprises an organic polymer and a hydroxylated carbon nanotube combined with the organic polymer. The organic polymer comprises a linear polymerization structure shown in the above formula (1), the hydroxylated carbon nanotube also has a linear structure, and the composite conductive agent formed by combining the organic polymer and the hydroxylated carbon nanotube can fully realize linear polymerization. Therefore, when the composite conductive agent is used as an additive to prepare the electrode plate slurry, compared with the traditional acrylic binder, the composite conductive agent can give full play to the coating effect of linear polymerization, enhance the bonding and binding effect on other particulate matter in the slurry (for example, silicon-based active material particles), improve the inhibition effect on the volume expansion of other particulate matter (especially silicon-based active material particles) during the cycle, reduce the rebound of the electrode plate, reduce the expansion force during the cycle of the battery cell, and improve the cycle life of the battery cell.

In addition, since the composite conductive agent contains the organic polymer, which can play a better role in thickening and stabilizing the slurry, and the long-chain molecule thereof can be suspended in the aqueous solution to stabilize other particulate matter in the slurry, in this way, compared with the traditional linear CNT (carbon nanotube), the composite conductive agent can promote the stabilizing effect of the organic polymer on the linear carbon nanotube by combining the organic polymer with the hydroxylated carbon nanotube, reduce the crosslinking and entanglement of the carbon nanotube, improve the distribution state of the carbon nanotube in the slurry, and improve the dispersion uniformity thereof, thereby further improving the machinability of the electrode plate and improving the fast charging performance of the battery cell. In addition, compared with traditional organic polymer binders, by combining the organic polymer with the hydroxylated carbon nanotube, the high conductivity of the carbon nanotube can also improve the conductivity of the binder, thereby obtaining a composite conductive agent with better overall performance.

In some embodiments, the polymer structure comprises a polymer structure having a structural formula represented by formula (2),

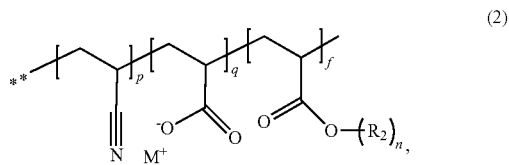

in the formula (2), ** represents a connection site of the polymer structure, p is an integer ranging from 1000 to 5000, q is an integer ranging from 1000 to 15000, f is an integer ranging from 500 to 4000, $2 \leq n \leq 200$, each $R_2$ is independently one selected from

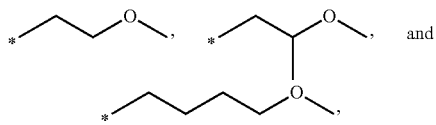

* represents a connection site of $R_2$, and $M^+$ is one selected from $Na^+$, $K^+$, $Li^+$ and $NH_4^+$.

It can be seen from the above formula (2) that compared with the traditional single-type monomer linear polymer, in the composite conductive agent of the present application, the linear structure of the molecular chain contains relatively many branched chains formed by a variety of different functional groups. These branched chains can reduce the brittleness of the composite conductive agent and enhance the flexibility thereof, thereby enhancing the flexibility of the electrode plate. Thus, after cold pressing with high compaction density, the ductility of the electrode plate can be improved, this can effectively reduce the occurrence of edge over-stress. In addition, the phenomenon of easy occurrence of the brittleness of the electrode plate under high compaction density during subsequent processing can also be reduced, and the machinability of the electrode plate can be improved.

In some embodiments, in the above structural formula (1) and structural formula (2) of the organic polymer, the polymerization degree m, p, q, f of each polymer structure will affect the bonding property of the composite conductive agent and the solubility and dispersibility in the slurry. When the polymerization degree of each polymer structure is relatively low, the bonding property of the composite conductive agent is likely to decrease; and when the polymerization degree of each polymer structure is relatively high, the solubility and dispersibility of the composite conductive agent in the slurry is likely to decrease. By controlling the polymerization degree m, p, q, and f of each polymerization structure within an appropriate range, the composite conductive agent can not only have a higher bonding property, but also enable the composite conductive agent to have better solubility and dispersibility in the slurry.

As a non-limiting example of the composite conductive agent, the schematic structural formula of the composite conductive agent may comprise any one of the following formulas (3) to (8):

(3)

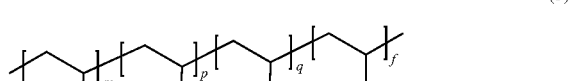

(4)

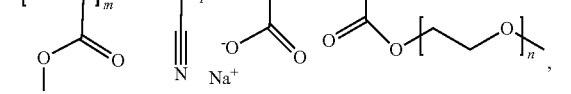

(5)

(6)

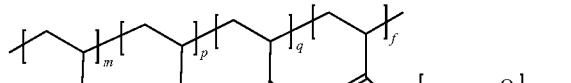

(7)

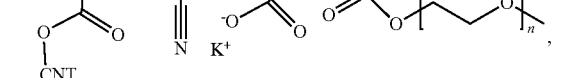

and (8)

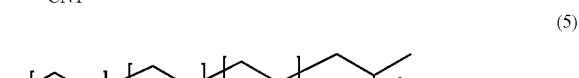

In some embodiments, the hydroxylated carbon nanotube is bound to the organic polymer through the ester group and/or the hydrogen bond. Alternatively, the hydroxylated carbon nanotube is bound to the organic polymer through the ester group.

It can be understood that the ester group can be obtained by esterification reaction between the hydroxyl functional group in the hydroxylated carbon nanotube and the carboxyl functional group in the organic polymer. After the ester group is formed between the hydroxylated carbon nanotube and the organic polymer, the carboxyl functional group in the organic polymer can be reduced, thereby reducing the hydrogen bond between molecules in the long chains of the polymer, effectively reducing the mutual aggregation between the long chains of the polymer, improving the uniformity of dispersion in the slurry, reducing the resistance of the electrode plate, and improving the kinetic performance of the battery cell.

In some embodiments, in the composite conductive agent, a weight percentage content of the organic polymer is 50% to 90%, for example, the weight percentage content of the organic polymer can be 60%, 65%, 70%, 75%, 80%, 85% or in a range formed by any of the above values. Optionally, the weight percentage content of the organic polymer is 65% to 80%.

In embodiments of the present application, the weight percentage content of the organic polymer in the composite conductive agent is in an appropriate range, which can not only provide a sufficient linear polymer structure for the composite conductive agent, give full play of the performance of the organic polymer, improve the cycle life of the battery cell and the machinability of the electrode plate; but also ensure that the composite conductive agent has high conductivity.

In some embodiments, in the composite conductive agent, the weight percentage content of the hydroxylated carbon nanotube is 10% to 50%, for example, the weight percentage content of the hydroxylated carbon nanotube may be 15%, 20%, 25%, 30%, 35%, 40%, 45%, or within a range formed by any of the above values. Optionally, the weight percentage content of hydroxylated carbon nanotube is 20% to 35%.

In the embodiment of the present application, the weight percentage content of hydroxylated carbon nanotubes in the composite conductive agent is within an appropriate range, which can not only ensure that the composite conductive agent has high conductivity, but also allow a sufficient number of ester groups to be formed between the organic polymer and the hydroxylated carbon nanotubes, thereby effectively reducing the carboxyl functional groups in the organic polymer, reducing the agglomerations formed by the hydrogen bonds between the long chains of the polymer, improving the uniformity of dispersion, and improving the kinetic performance of the battery cell.

The weight percentage contents of organic polymers and hydroxylated carbon nanotubes in the composite conductive agent are meanings known in the art, and can be measured by instruments and methods known in the art. For example, acid washing can be used to separate the organic part to obtain the CNT solid phase, so as to calculate the proportion.

In some embodiments, at least one hydroxyl group is attached to a surface of the hydroxylated carbon nanotube. Optionally, the hydroxylated carbon nanotube comprises a hydroxylated single-walled carbon nanotube and/or a hydroxylated multi-walled carbon nanotube.

It should be noted that the hydroxylated carbon nanotubes described in the present application is carbon nanotubes with at least one hydroxyl group on the surfaces thereof, and these hydroxyl groups can be connected to the surface of the carbon nanotube by methods including but not limited to grafting. As a non-limiting example of the hydroxylated carbon nanotubes, the hydroxylated carbon nanotubes may be commercial hydroxylated carbon nanotubes, or may be obtained by acid-washing the carbon nanotubes.

A second aspect of the embodiments of the present application provides a method for preparing a composite conductive agent, comprising the following steps:
S10, enabling acrylate and acrylic acid to react with a hydroxylated carbon nanotube to obtain a pre-reacted mixture; and
S20. polymerizing the pre-reacted mixture with acrylonitrile and a polyether polyol monoacrylate to form an organic polymer combined with the hydroxylated carbon nanotube, thereby obtaining a composite conductive agent, wherein the composite conductive agent comprises the organic polymer and the hydroxylated carbon nanotube, and the organic polymer has a structural formula represented by formula (1),

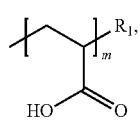

(1)

in the formula (1), m is an integer ranging from 2500 to 20000, and $R_1$ is a polymer structure comprising an ester group and a nitrile group.

In the method provided in the present application, by enabling acrylate and acrylic acid to pre-react with the hydroxylated carbon nanotube, the pre-polymerization of acrylate and acrylic acid with the hydroxylated carbon nanotube can be realized, such that a part of acrylate and acrylic acid to form oligomers through pre-polymerization, and at the same time a part of the hydroxylated carbon nanotubes are enabled to be grafted to the oligomers through esterification, thereby obtaining a pre-reacted mixture. Then the pre-reacted mixture is polymerized with acrylonitrile and polyether polyol monoacrylate to achieve linear polymerization of the pre-reacted mixture, acrylonitrile and polyether polyol monoacrylate to form an organic polymer having the structural formula represented by formula (1), and more hydroxylated carbon nanotubes are grafted onto the organic polymer through the esterification reaction, so as to combine with the organic polymer to obtain a composite conductive agent. Polyacrylic acid and polyacrylonitrile formed after the polymerization of acrylic acid and acrylonitrile have good bonding effects, and such bonding effect can be further enhanced after polyacrylic acid and polyacrylonitrile are polymerized, which is conducive to giving full play to the coating effect of linear polymerization, enhancing the bonding and binding effect on other particulate matter in the slurry (for example, silicon-based active material particles), improving the inhibition effect on the volume expansion of other particulate matter (especially silicon-based active material particles) during the cycle, reducing the rebound of the electrode plate, reducing the expansion force during the cycle of the battery cell, and improving the cycle life of the battery cell.

In some embodiments, the above step S10 may comprise the following steps:

S100, contacting and mixing the polymerization aid, the acrylate, the acrylic acid, with the hydroxylated carbon nanotube in water to form a first mixed solution; and
S110, performing a first heat treatment on the first mixed solution, to subject the acrylate, the acrylic acid, and the hydroxylated carbon nanotube with a prepolymerization reaction.

In the above steps S100 to S110, after the first heat treatment is performed on the first mixed solution formed by the polymerization aid, the acrylate, the acrylic acid, and the hydroxylated carbon nanotube, a part of the acrylate and the acrylic acid can be prepolymerized to form the oligomer. At the same time, a part of the hydroxylated carbon nanotube can be grafted onto the oligomer through esterification to obtain the pre-reacted mixture. Structurally speaking, in the above pre-reaction, the hydroxylated carbon nanotubes are mainly linked with the acrylic acid parts. The purpose of the pre-polymerization reaction is to separately pre-react the relevant components to strengthen the linking effect and avoid the decrease of the bonding force and the instability of the linking structure caused by the interference of subsequent components. Because acrylate and acrylic acid have similar structures, the polymerization will be easier, so acrylate is introduced simultaneously for pre-polymerization.

In some embodiments, the type of the acrylate is not particularly limited, as long as the prepolymerization reaction can be achieved and the polymer structure of the polyacrylate can be obtained in the organic polymer. For example, the acrylate may comprise at least one of sodium acrylate, potassium acrylate, lithium acrylate, and ammonium acrylate.

In some embodiments, in the first mixed solution, the weight percentage content of the acrylate is 3% to 25%. For example, the weight percentage content of acrylate may be 5%, 7%, 11%, 13%, 15%, 17%, 19%, 21%, 23% or within a range formed by any of the above values. Optionally, the weight percentage content of acrylate is 5% to 15%. Acrylate and acrylic acid monomers in the first mixed solution have similar molecular structures, and synchronous polymerization is conducive to improving the reaction efficiency of the overall preparation process, while avoiding the introduction of too many types of monomer molecules in subsequent polymerization reactions.

In some embodiments, in the first mixed solution, the weight percentage content of the acrylic acid is 5% to 40%. For example, the weight percentage content of acrylic acid can be 10%, 15%, 20%, 25%, 30%, 35% or within a range formed by any of the above values. Optionally, the weight percentage content of acrylic acid is 15% to 25%. The weight percentage content of acrylic acid in the first mixed solution is within an appropriate range, which is conducive to obtaining a polyacrylonitrile polymer structure with a corresponding polymerization degree in the organic polymer, thereby enabling the composite conductive agent to have higher bonding property, as well as enabling the composite conductive agent to have better solubility and dispensability in the slurry.

In some embodiments, in the first mixed solution, the weight percentage content of the hydroxylated carbon nanotubes is 1% to 10%. For example, the weight percentage content of hydroxylated carbon nanotubes can be 3%, 5%, 7%, 9% or within a range formed by any of the above values. Optionally, the weight percentage content of hydroxylated carbon nanotubes is 3% to 7%. The weight percentage content of the hydroxylated carbon nanotubes in the first mixed solution is within an appropriate range, which is conducive to the consumption of carboxyl functional groups in the mixed solution through esterification, thereby effectively reducing the carboxyl functional groups contained in the final organic polymer, reducing the agglomeration of long chains of polymers due to hydrogen bonds, improving the uniformity of dispersion, and improving the kinetic performance of the battery cell.

In some embodiments, the type of the polymerization aid is not particularly limited, as long as the polymerization aid can function as a surfactant in the prepolymerization reaction and can break intramolecular and intermolecular hydrogen bonds. For example, the polymerization aid may comprise sodium lauryl sulfate and/or sodium lauryl sulfate.

In the first mixed solution, the weight percentage content of the polymerization aid is 2% to 5%. For example, the weight percentage content of the polymerization aid can be 2.5%, 3.0%, 3.5%, 4.0%, 4.5% or within a range formed by any of the above values. Optionally, the weight percentage content of the polymerization aid is 3% to 4.5%. The weight percentage content of the polymerization aid in the first mixed solution is within an appropriate range, in this way, while acting as a surfactant, the polymerization aid can also break intramolecular and intermolecular hydrogen bonds, which is beneficial to promoting the progress of the prepolymerization reaction.

In some embodiments, the temperature of the first heat treatment is 50° C. to 85° C., optionally 65° C. to 80° C. The temperature of the first heat treatment is controlled within an appropriate range, which is conducive to further promoting the progress of the prepolymerization reaction.

As a non-limiting example of step S10, sodium dodecylsulfonate, acrylic acid, sodium acrylate, and hydroxylated CNT can be added to 1 kg of distilled water, stirred evenly and then heated to 70° C., to obtain a pre-reacted mixture.

In some embodiments, the above step S20 may comprise the following steps:

S200, contacting and mixing the polymerization initiator, the acrylonitrile, and the polyether polyol monoacrylate in a solution of the pre-reacted mixture to obtain a second mixed solution; and S210, performing a second heat treatment on the second mixed solution, to subject the acrylonitrile, the polyether polyol monoacrylate, and the pre-reacted mixture with a polymerization reaction, whereby forming the polymer structure; in which, the polymer structure comprises a polymer structure having a structural formula represented by formula (2),

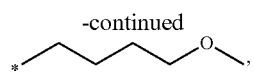
(2)

in the formula (2), ** represents a connection site of the polymer structure, p is an integer ranging from 1000 to 5000, q is an integer ranging from 1000 to 15000, f is an integer ranging from 500 to 4000, $2 \leq n \leq 200$, each $R_2$ is independently one selected from

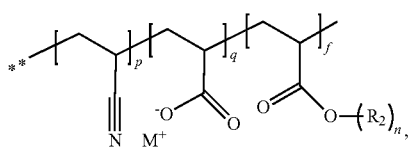

* represents a connection site of $R_2$, and $M^+$ is one selected from $Na+$, $K^+$, $Li^+$ and $NH_4^+$.

In the above steps S200 to S210, the pre-reacted mixture is polymerized with acrylonitrile and polyether polyol monoacrylate to realize the linear polymerization of the pre-reacted mixture, acrylonitrile and polyether polyol monoacrylate to form a polymerization structure comprising the structural formula represented by formula (2), to obtain an organic polymer, and to graft more hydroxylated carbon nanotubes to the organic polymer through esterification, thereby combining with the organic polymer to obtain a composite conductive agent.

In some embodiments, the type of the polyether polyol monoacrylate is not particularly limited, as long as the polymerization reaction can be realized and the polymerized structure of the poly(polyether polyol monoacrylate) can be obtained in the organic polymer. For example, the polyether polyol monoacrylate may comprise at least one of polyethylene glycol monoacrylate, polypropylene glycol monoacrylate, and polytetrahydrofuran glycol monoacrylate.

In some embodiments, in the second mixed solution, the weight percentage content of the polyether polyol monoacrylate is 10% to 40%. For example, the weight percentage content of polyether polyol monoacrylate can be 15%, 20%, 25%, 30%, 35% or within a range formed by any of the above values. Optionally, the weight percentage content of polyether polyol monoacrylate is 20% to 35%. The weight percentage content of polyether polyol monoacrylate in the second mixed solution is controlled within an appropriate range, which is conducive to the formation of organic polymers and the obtaining of the polymer structure of the poly(polyether polyol monoacrylate) with a corresponding polymerization degree in the organic polymer, so that the electrode plate has better flexibility, prevents brittle fracture, can withstand deformation during processing, and can also withstand deformation caused by volume changes during battery cycles, thereby improving the service life.

In some embodiments, in the second mixed solution, the weight percentage content of the acrylonitrile is 5% to 30%. For example, the weight percentage content of acrylonitrile can be 10%, 15%, 20%, 25%, or within a range formed by any of the above values. Optionally, the weight percentage content of acrylonitrile is 10% to 20%.

The weight percentage content of acrylonitrile in the second mixed solution is within an appropriate range, which is conducive to obtaining a polyacrylonitrile polymer structure with a corresponding polymerization degree in the organic polymer, thereby enabling the composite conductive agent to have higher bonding property, as well as enabling the composite conductive agent to have better solubility and dispensability in the slurry. In addition, the polyacrylonitrile formed after the polymerization of acrylonitrile also has a good bonding effect, thus can enhance the bonding property of the polyacrylic acid polymer structure in the organic polymer, which is conducive to giving full play to the coating effect of the composite conductive agent, enhancing the bonding and binding effect on other particulate matter in the slurry, improving the inhibition effect on the volume expansion of other particulate matter (especially silicon-based active material particles) during the cycle, reducing the rebound of the electrode plate, reducing the expansion force during the cycle of the battery cell, and improving the cycle life of the battery cell.

In some embodiments, the type of the polymerization initiator is not particularly limited, as long as it can initiate the reaction in the polymerization reaction. For example, the polymerization initiator may comprise at least one of potassium sulfate, potassium persulfate, and sodium persulfate.

In the second mixed solution, the weight percentage content of the polymerization initiator is 1% to 3%. For example, the weight percentage content of the polymerization initiator may be 1.5%, 2%, 2.5%, or within a range formed by any of the above values. Optionally, the weight percentage content of the polymerization aid is 2% to 2.5%. The weight percentage content of the polymerization initiator in the second mixed solution is in an appropriate range, which is favorable for initiating and promoting the progress of the polymerization reaction.

In some embodiments, the temperature of the second heat treatment is 50° C. to 85° C., optionally 65° C. to 80° C. The temperature of the second heat treatment is controlled within an appropriate range, which is conducive to further promoting the progress of the polymerization reaction.

As a non-limiting example of step S20, potassium sulfate can be added to the solution of the pre-reaction mixture, polyethylene glycol monoacrylate and acrylonitrile are uniformly added simultaneously, heated to 70° C., and continuously stirred for 2 hrs to 3 hrs. During the reaction process, various reagents can be slowly added in equal proportions according to the required weight percentage, and the composite conductive agent can be obtained after centrifugation, removal of the supernatant, and purification.

In some embodiments, before obtaining the composite conductive agent, the method of the present application may further comprise the following step S30 of preparing the polyether polyol monoacrylate:

S30, contacting acrylic acid with a polyether polyol for esterification reaction, whereby obtaining the polyether polyol monoacrylate.

Polyether polyol monoacrylate can be obtained by esterification of acrylic acid and polyether polyol. The ether bond contained in the polyether polyol monoacrylate can effectively enhance the flexibility of the composite conductive agent in the finally obtained composite conductive agent, thereby enhancing the flexibility of the electrode plate and improving the machinability of the electrode plate.

In some embodiments, the type of the polyether polyol is not particularly limited, as long as the polyether polyol can undergo an esterification reaction with acrylic acid and having a molecular structure comprising ether bonds. For example, the polyether polyol may comprise at least one of polyethylene glycol, polypropylene glycol, and polytetrahydrofuran glycol.

In some embodiments, a polymerization degree of the polyether polyol is 2 to 200, optionally 50 to 150. The polymerization degree of the polyether polyol is mainly represented by the length of the side chain. A suitable polymerization degree can improve the problem that the linear structure of the main chain causes the electrode plate brittle, while too long the main chain will easily lead to decreased bonding property and slurry processing problems.

In some embodiments, the above step S30 may further comprise the following steps:

S300, contacting and mixing the acrylic acid and the polyether polyol in water to form a third mixed solution;

S310, adding a catalyst and a polymerization inhibitor to the third mixed solution;

S320, performing a third heat treatment on the third mixed solution to obtain a solution of the polyether polyol monoacrylate;

S330, purifying the solution of the polyether polyol monoacrylate to obtain the polyether polyol monoacrylate.

In the above steps S300 to S330, acrylic acid and the polyether polyol can be subjected to esterification reaction under the action of the catalyst and the polymerization inhibitor. The esterification reaction can make the carboxyl group in acrylic acid and the hydroxyl group in polyether polyol link to form polyether polyol monoacrylate.

In some embodiments, a molar ratio of the acrylic acid to the polyether polyol is (5:1) to (1:1), optionally (1.5:1) to (2.5:1). The molar ratio of acrylic acid and polyether polyol is controlled in an appropriate range, which is conducive to the occurrence of esterification, so as to obtain the polyether polyol monoacrylate as a target product.

In some embodiments, a type of the catalyst is not particularly limited, as long as it can play a catalytic function in the esterification reaction and increase the rate of the reaction. For example, the catalyst may comprise at least one of p-toluenesulfonic acid, sulfuric acid, and aluminum oxide.

In some embodiments, in the third mixed solution, the weight percentage content of the catalyst is 3% to 10%. For example, the weight percentage content of the catalyst can be 4%, 5%, 6%, 7%, 8%, 9% or within a range formed by any of the above values. Optionally, the weight percentage content of the catalyst is 5% to 9%. The weight percentage content of the catalyst in the third mixed solution is in an appropriate range, so that the catalyst can play a better role in catalytic promotion.

In some embodiments, the type of the polymerization inhibitor is not particularly limited, as long as it can prevent the polymerization of the acrylic acid monomer in the esterification reaction. For example, the polymerization inhibitor may comprise at least one of hydroquinone, p-hydroxyanisole, and 2,6-di-tert-butyl-p-cresol.

In some embodiments, in the third mixed solution, the weight percentage content of the polymerization inhibitor is 1% to 5%. For example, the weight percentage content of the polymerization inhibitor can be 1.5%, 2.0%, 2.5%, 3.0%, 3.5%, 4.0%, 4.5% or within a range formed by any of the above values. Optionally, the weight percentage content of the polymerization inhibitor is 3% to 4.5%. The weight percentage content of the polymerization inhibitor in the third mixed solution is in an appropriate range, so that the polymerization inhibitor can better prevent the polymerization of the acrylic acid monomer.

In some embodiments, the temperature of the third heat treatment is 60° C. to 85° C., optionally 70° C. to 80° C. The temperature of the third heat treatment is controlled within an appropriate range, which is conducive to promoting the progress of the esterification reaction.

As a non-limiting example of the esterification reaction in step S30, the reaction process can be represented by any one of the following reaction formulas (I) to (III):

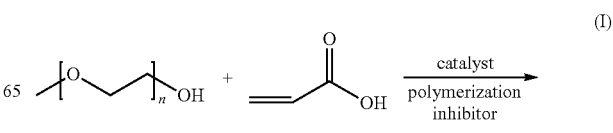

(I)

-continued

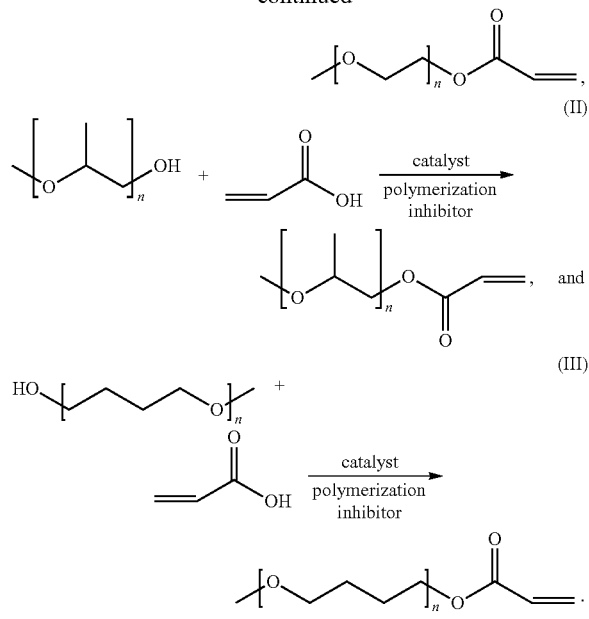

As a non-limiting example of step S30, polyethylene glycol and acrylic acid can be added to distilled water at a molar ratio of 1:1 to obtain a solution having a concentration of 20%. A catalyst and a polymerization inhibitor are added, stirred evenly and then heated to 70° C., to obtain a solution of polyethylene glycol monoacrylate. Then the solution of polyethylene glycol monoacrylate is dissolved in dichloromethane, washed with 5% sodium hydroxide solvent, performed with liquid separation to remove an aqueous solution, a remaining phase is then washed with a saturated sodium chloride solution, performed with liquid separation to remove excess polyether substances, and finally distilled to remove the solvent, to obtain polyethylene glycol monoacrylate monomer.

In some embodiments, before obtaining the composite conductive agent, the method of the present application may further comprise the following step S40 of preparing the acrylate:

S40, contacting acrylic acid with an alkaline reagent for reaction, to obtain the acrylate.

Acrylic acid is salified by reacting acrylic acid with an alkaline reagent to obtain an acrylate. By salifying the carboxylic acid functional group in acrylic acid, the action of the hydrogen bond on the polyacrylate molecular chain during the subsequent polymerization reaction can be reduced, and the mutual aggregation between the molecular chains can be weakened, so that the final conductive binder can be evenly dispersed in the slurry, thereby improving the kinetic performance of the battery cell.

In some embodiments, the above step S40 may further comprise the following steps:

S400, adding the alkaline reagent to a solution of acrylic acid to enable a pH value of a resulting solution to be 7 to 8, whereby obtaining a solution of the acrylate;

S410, performing distillation and drying on the solution of the acrylate.

In the above steps S400 to S410, by controlling the pH value of the solution, the amount of the reactants acrylic acid and alkaline reagent can be controlled indirectly, and by controlling the amount of the reactants within appropriate ranges, the occurrence of the salification reaction is facilitated, thereby obtaining the target product acrylate.

In some embodiments, the type of the acrylate is not particularly limited, as long as the polymerization reaction can be realized in the subsequent reaction process and the polymer structure of polyacrylate can be obtained in the organic polymer. For example, the acrylate may comprise at least one of sodium acrylate, potassium acrylate, lithium acrylate, and ammonium acrylate.

In some embodiments, the type of the alkaline reagent is not particularly limited, as long as the alkaline reagent can salify acrylic acid to reduce carboxyl groups contained in acrylic acid. For example, the alkaline reagent comprises at least one of sodium hydroxide, potassium hydroxide, lithium hydroxide, and ammonia water.

As a non-limiting example of the salification reaction in step S40, the reaction process can be represented by the following reaction formula (IV):

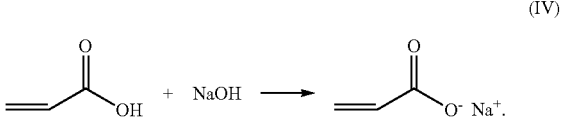

As a non-limiting example of step S40, sodium hydroxide solution can be slowly added dropwise to the aqueous solution of acrylic acid, the solution is stirred during the dropwise addition until the pH value of the solution is 7 to 8, and then a resulting solution is distilled and dried to obtain sodium acrylate particles.

Electrode Plate

The third aspect of the embodiments of the present application provides an electrode plate, comprising the composite conductive agent of the first aspect of the present application or the composite conductive agent prepared by the method of the second aspect of the present application.

In some embodiments, the electrode plate may comprise an anode plate and/or a cathode plate. The electrode plate comprises a composite conductive agent. The composite conductive agent can improve the dispersion effect of the slurry, enhance the dispersion uniformity of the slurry, and reduce the occurrence of slurry gelation. After the slurry containing the composite conductive agent is coated on the electrode plate, the cold pressing window of the electrode plate after drying can be improved, and the machinability of the electrode plate can be improved. In addition, the composite conductive agent can inhibit the rebound of the electrode plate during the cycle, reduce the growth of the expansion force of the battery cell, and improve the cycle life of the battery cell.

It should be noted that when being used in electrode plates, the composite conductive agent of the present application can be used alone as a conductive agent or a binder, or mixed with other conventional binders or conductive agents.

In some embodiments, the anode plate may comprise the composite conductive agent of the first aspect of the present application or the composite conductive agent prepared by the method of the second aspect of the present application.

In some embodiments, the cathode plate may comprise the composite conductive agent of the first aspect of the present application or the composite conductive agent prepared by the method of the second aspect of the present application.

It should be noted that when the conductive agent binder of the present application is used in the cathode plate, the active material in the cathode plate must be a cathode material that is not sensitive to moisture, for example, lithium iron phosphate cathode material.

Secondary Battery

The fourth aspect of the embodiments of the present application provides a secondary battery, comprising any apparatus in which an electrochemical reaction occurs to convert chemical energy into electrical energy, for example, a lithium ion secondary battery or a sodium ion secondary battery.

In some embodiments, the secondary battery of the present application comprises the electrode plate according to the third aspect of the present application, and the electrode plate comprises a cathode plate, an anode plate, a separator, and an electrolyte. During the charging and discharging process of the battery, active ions are repeatedly intercalated and deintercalated between the cathode and the anode. The electrolyte plays the role of conducting ions between the cathode plate and the anode plate. The separator is arranged between the cathode plate and the anode plate, which mainly plays a role in preventing the short circuit of the cathode plate and the anode plate, as well as allowing ions to pass through.

Cathode Plate

The cathode plate comprises a cathode collector and a cathode film layer arranged on at least one surface of the cathode collector, and the cathode film layer comprises a cathode active material. As an example, the cathode current collector has two opposing surfaces in its own thickness direction, and the cathode film layer is disposed on any one or both of the two opposing surfaces of the cathode current collector.

In some embodiments, the cathode current collector can be a metal foil or a composite current collector. For example, aluminum foil can be used as the metal foil. The composite current collector may comprise a polymer substrate and a metal layer formed on at least one surface of the polymer substrate. The composite current collector may be formed by forming a metal material on a polymer substrate. The metal material includes, but is not limited to, aluminum, an aluminum alloy, nickel, a nickel alloy, titanium, a titanium alloy, silver, and a silver alloy. The polymer substrate can be substrate made of, for example, a polypropylene (PP), a polyethylene terephthalate (PET), a polybutylene terephthalate (PBT), a polystyrene (PS), a polyethylene (PE), and the like.

In some embodiments, the cathode active material may include a cathode active material known in the art for the battery. As an example, the cathode active material may include at least one of the following materials: olivine-structured lithium-containing phosphate, lithium transition metal oxide, and respective modified compounds thereof. However, the present application is not limited to these materials, and other conventional materials that can be used as cathode active materials of batteries can also be used. These cathode active materials may be used alone or in combination of two or more of these cathode active materials. Examples of lithium transition metal oxides may include, but are not limited to, at least one of lithium cobalt oxides (such as $LiCoO_2$), lithium nickel oxides (such as $LiNiO_2$), lithium manganese oxides (such as $LiMnO_2$, $LiMn_2O_4$), lithium nickel cobalt oxides, lithium manganese cobalt oxides, lithium nickel manganese oxides, lithium nickel cobalt manganese oxides (such as $LiNi_{1/3}Co_{1/3}Mn_{1/3}O_2$ (also can be referred to as $NCM_{333}$ for short), $LiNi_{0.5}Co_{0.2}Mn_{0.3}O_2$ (also can be referred to as $NCM_{523}$), $LiNi_{0.5}Co_{0.25}Mn_{0.25}O_2$ (also can be referred to as $NCM_{211}$), $LiNi_{0.6}Co_{0.2}Mn_{0.2}O_2$ (also can be referred to as $NCM_{622}$), $LiNi_{0.8}Co_{0.1}Mn_{0.1}O_2$ (also can be referred to as $NCM_{811}$), lithium nickel cobalt aluminum oxide (such as $LiNi_{0.85}Co_{0.15}Al_{0.05}O_2$), and modifying compounds thereof, etc. Examples of lithium-containing phosphates with an olivine structure may include, but are not limited to, at least one of lithium iron phosphate (such as $LiFePO_4$ (also can be referred to as LFP)), a composite material of lithium iron phosphate and carbon, lithium manganese phosphate (such as $LiMnPO_4$), a composite material of lithium manganese phosphate and carbon, lithium manganese iron phosphate, and a composite material of lithium iron manganese phosphate and carbon.

In some embodiments, the cathode active material may further include at least one of the following materials: sodium transition metal oxides, polyanionic compounds, and Prussian blue compounds. However, the present application is not limited to these materials, and other conventional materials that can be used as cathode active materials of batteries can also be used. These cathode active materials may be used alone or in combination of two or more thereof.

As an optional technical solution of the present application, in the sodium transition metal oxide, the transition metal may be at least one of Mn, Fe, Ni, Co, Cr, Cu, Ti, Zn, V, Zr, and Ce. The sodium transition metal oxide is, for example, $Na_xMO_2$, M is one or more of Ti, V, Mn, Co, Ni, Fe, Cr, and Cu, $0<x\leq 1$.

As an optional technical solution of the present application, the polyanionic compounds may be one class of compounds having sodium ions, compounds having transition metal ions, and compounds having tetrahedral $(YO_4)^{n-}$ anion units. The transition metal can be at least one of Mn, Fe, Ni, Co, Cr, Cu, Ti, Zn, V, Zr, and Ce; Y can be at least one of P, S and Si; and n represents the valence state of $(YO_4)^{n-}$.

The polyanionic compounds can also be one class of compounds having sodium ions, compounds having transition metal ions, compounds having tetrahedral $(YO_4)^{n-}$ anion units, and compounds having halogen anions. The transition metal can be at least one of Mn, Fe, Ni, Co, Cr, Cu, Ti, Zn, V, Zr, and Ce; Y can be at least one of P, S and Si, and n represents the valence state of $(YO_4)^{n-}$; the halogen can be at least one of F, Cl, and Br.

The polyanionic compounds may also be one class of compounds having sodium ions, compounds having tetrahedral $(YO_4)^{n-}$ anion units, compounds having polyhedral units $(ZO_y)M^+$, and optionally compounds having halide anions. Y can be at least one of P, S, and Si, n represents the valence state of $(YO_4)^{n-}$; Z represents a transition metal, which can be at least one of Mn, Fe, Ni, Co, Cr, Cu, Ti, Zn, V, Zr, and Ce, and m represents the valence state of $(ZO_y)M^+$; the halogen can be at least one of F, Cl, and Br.

The polyanionic compound is at least one of $NaFePO_4$, $Na_3V_2(PO_4)_3$ (sodium vanadium phosphate, NVP for short), $Na_4Fe_3(PO_4)_2(P_2O_7)$, $NaM'PO_4F$ (in which, M' is one or more of V, Fe, Mn, and Ni), and $Na_3(VO_y)_2(PO_4)_2F_{3-2y}$ ($0\leq y\leq 1$).

The Prussian blue compounds may be one class of compounds having sodium ions, compounds having transition metal ions, and compounds having cyanide ions ($CN^-$). The transition metal may be at least one of Mn, Fe, Ni, Co, Cr, Cu, Ti, Zn, V, Zr, and Ce. The Prussian blue compound is, for example, $Na_aMe_bMe'_c(CN)_6$, in which, Me and Me' are each independently at least one of Ni, Cu, Fe, Mn, Co, and Zn, $0<a\leq 2$, $0<b<1$, and $0<c<1$.

In some embodiments, the cathode film layer may optionally include the composite conductive agent of the first aspect of the present application or the composite conductive agent prepared according to the method of the second aspect of the present application.

In some embodiments, the cathode film layer does not exclude other conventional conductive agents in addition to the composite conductive agent provided by the present application. As an example, other conventional conductive agents may include at least one of a superconducting carbon, an acetylene black, a carbon black, a Ketjen black, a carbon dot, a carbon nanotube, a graphene, and a carbon nanofiber.

In some embodiments, the cathode film layer does not exclude other conventional binders in addition to the composite conductive agent provided in the present application. As an example, other conventional binders may include at least one of a polyvinylidene fluoride (PVDF), a polytetrafluoroethylene (PTFE), vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and a fluorine-containing acrylate resin.

The cathode plate in the present application can be prepared according to conventional methods in the art. For example, the cathode film layer is usually formed by coating the cathode slurry on the cathode current collector, drying, and cold pressing. The cathode slurry is usually formed by dispersing the cathode active material, optionally the composite conductive agent, optionally other conventional conductive agent, optionally other conventional binder, and any other components, in a solvent and stirring them uniformly. The solvent may be N-methylpyrrolidone (NMP), but is not limited thereto.

The cathode plate of the present application does not exclude other additional functional layers in addition to the cathode film layer. For example, in some embodiments, the cathode plate of the present application further includes a conductive primer layer (for example, composed of a conductive agent and a binder) that is sandwiched between the cathode current collector and the cathode film layer and disposed on the surface of the cathode current collector. In some other embodiments, the cathode plate of the present application further includes a protective layer covering the surface of the cathode film layer.

Anode Plate

The anode plate includes an anode current collector and an anode film layer arranged on at least one surface of the anode current collector, and the anode film layer includes an anode active material. As an example, the anode current collector has two opposing surfaces in its own thickness direction, and the anode film layer is disposed on any one or both of the two opposing surfaces of the anode current collector.

In some embodiments, the anode current collector can use a metal foil or a composite current collector. For example, a copper foil can be used as the metal foil. The composite current collector may include a polymer substrate and a metal layer formed on at least one surface of the polymer substrate. The composite current collector may be formed by forming a metal material on a polymer substrate. The metal material includes, but is not limited to, copper, a copper alloy, nickel, a nickel alloy, titanium, a titanium alloy, silver, a silver alloy, and the like. The polymer substrate includes, but is not limited to, substrates made of polypropylene (PP), a polyethylene terephthalate (PET), a polybutylene terephthalate (PBT), a polystyrene (PS), a polyethylene (PE), and the like.

In some embodiments, the anode active material can be an anode active material known in the art for secondary batteries. As an example, the anode active material may include at least one of the following materials: an artificial graphite, a natural graphite, a soft carbon, a hard carbon, a silicon-based material, a tin-based material, a lithium titanate, and the like. The silicon-based material may be at least one of selected from elemental silicon, silicon-oxygen compounds, silicon-carbon composites, silicon-nitrogen composites, and silicon alloys. The tin-based material may be at least one of selected from simple tin, tin oxide compounds, and tin alloys. However, the present application is not limited to these materials, and other conventional materials that can be used as anode active materials of batteries can also be used. These anode active materials may be used alone or in combination of two or more thereof.

In some embodiments, the anode film layer can also optionally include the composite conductive agent according to the first aspect of the present application or the composite conductive agent prepared according to the method of the second aspect of the present application.

In some embodiments, the anode film layer does not exclude other conventional binders in addition to the composite conductive agent provided in the present application. Other conventional binders may be at least one of selected from a styrene-butadiene rubber (SBR), a polyacrylic acid (PAA), a sodium polyacrylate (PAAS), a polyacrylamide (PAM), a polyvinyl alcohol (PVA), a sodium alginate (SA), a polymethacrylic acid (PMAA), and a carboxymethyl chitosan (CMCS).

In some embodiments, the anode film layer does not exclude other conventional conductive agents in addition to the composite conductive agent provided in the present application. Other conventional conductive agents may be at least one of selected from a superconducting carbon, an acetylene black, a carbon black, a Ketjen black, a carbon dot, a carbon nanotube, a graphene, and a carbon nanofiber.

In some embodiments, the anode film layer may optionally include other additives, such as thickeners (such as sodium carboxymethylcellulose (CMC-Na)) and the like.

In some embodiments, the anode plate can be prepared in the following manner: dispersing the components for preparing the anode plate, such as the anode active material, optionally composite conductive agent, optionally other conventional conductive agent, optionally other conventional binder and any other components in a solvent (such as deionized water) to form an anode slurry; coating the anode slurry on the anode current collector, and performing drying, cold pressing, and other processes, to obtain the anode plate.

In some embodiments, the anode plate can be prepared as follows: dispersing the components for preparing the anode plate, such as the anode active material, the conductive agent, the binder, and any other components, in a solvent (such as a deionized water) to form an anode slurry; coating the anode slurry on the anode current collector, and performing drying, cold pressing, and other processes, to obtain the anode plate.

Electrolyte

The electrolyte plays the role of conducting active ions between the cathode plate and the anode plate. Any suitable electrolyte can be used in the secondary battery of the present application.

In some embodiments, the electrolyte includes an organic solvent, an electrolyte salt, and optionally additives. The types of the organic solvent, the electrolyte salt, and the additives are not limited and can be selected according to requirements.

In some embodiments, the electrolyte salt may be selected from lithium hexafluorophosphate (LiPF$_6$), lithium tetrafluoroborate (LiBF$_4$), lithium perchlorate (LiClO$_4$), lithium hexafluoroarsenate (LiAsF$_6$), lithium bisfluorosulfonimide (LiFSI), lithium bistrifluoromethanesulfonylimide (LiTFSI), lithium trifluoromethanesulfonate (LiTFS), lithium difluorooxalate borate (LiDFOB), lithium dioxalate borate (LiBOB), One or more of lithium difluorophosphate (LiPO$_2$F$_2$), lithium difluorooxalatephosphate (LiDFOP) and lithium tetrafluorooxalatephosphate (LiTFOP).

In some embodiments, the electrolyte salt may include, but is not limited to, at least one of NaPF$_6$, NaClO$_4$, NaBCl$_4$, NaSO$_3$CF$_3$, and Na(CH$_3$)C$_6$H$_4$SO$_3$. The above electrolyte salts may be used alone or in combination of two or more.

In some embodiments, as an example, the organic solvent includes, but is not limited to, at least one of ethylene carbonate (EC), propylene carbonate (PC), ethylmethyl carbonate (EMC), diethyl carbonate (DEC), dimethyl carbonate (DMC), dipropyl carbonate (DPC), methylpropyl carbonate (MPC), ethylene propylene carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE). The above-mentioned organic solvents may be used alone or in combination of two or more thereof. Optionally, two or more of the above organic solvents are used at the same time.

In some embodiments, the additives may include anode film-forming additives, cathode film-forming additives, and may further include additives that can improve certain performances of the battery, such as additives that improve battery overcharge performance, additives that improve high-temperature or low-temperature performance of the battery, and the like.

As examples, the additives include, but are not limited to, at least one of fluoroethylene carbonate (FEC), vinylene carbonate (VC), vinyl ethylene carbonate (VEC), vinyl sulfate (DTD), propylene sulfate, vinyl sulfite (ES), 1,3-propane sultone (PS), 1,3-propene sultone (PST), cyclic quaternary ammonium sulfonates, succinic anhydride, succinonitrile (SN), adiponitrile (AND), tris(trimethylsilane) phosphate (TMSP), tris(trimethylsilane) borate (TMSB).

The electrolyte can be prepared according to conventional methods in the art. For example, an organic solvent, an electrolyte salt, and optionally additives can be uniformly mixed to obtain an electrolyte. The order of adding the materials is not particularly limited. For example, the electrolyte salt and optionally additives are added to the organic solvent and mixed uniformly to obtain an electrolyte; or, the electrolyte salt is first added to the organic solvent, and then optionally additives are added to the organic solvent and mixed uniformly to obtain an electrolyte.

Separator

The separator is arranged between the cathode plate and the anode plate, which mainly plays a role in preventing the short circuit of the cathode plate and the anode plate, and in addition, allows active ions to pass through. The present application has no particular limitation on the type of the separator, and any known porous structure separator with good chemical stability and mechanical stability can be selected.

In some embodiments, the material of the separator can be one or more selected from a glass fiber, a non-woven fabric, a polyethylene, a polypropylene, and a polyvinylidene fluoride, but is not limited to these. The separator can be a single-layer film or a multi-layer composite film. When the separator is a multi-layer composite film, the materials of each layer are the same or different. In some embodiments, a ceramic coating or a metal oxide coating may also be provided on the separator.

In some embodiments, the cathode plate, the anode plate, and the separator can be made into an electrode assembly through a winding process or a lamination process.

In some embodiments, the secondary battery cell may include an outer package. The outer package can be used to package the above electrode assembly and electrolyte.

In some embodiments, the outer packaging of the secondary battery cell may be a hard case, such as a hard plastic case, an aluminum case, a steel case, and the like. The outer packaging of the secondary battery cell may also be a soft case, such as a bag-type soft case. The material of the soft case may be plastic, and examples of the plastic include a polypropylene (PP), a polybutylene terephthalate (PBT), a polybutylene succinate (PBS), and the like.

The present application has no special limitation on the shape of the secondary battery, which may be cylindrical, square, or any other shape. For example, FIG. 1 shows an exemplary square-shaped secondary battery 5.

Figure 2:
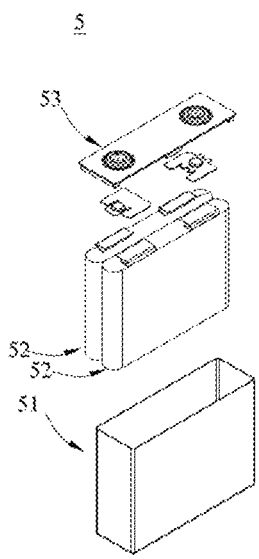
FIG. 2 is an exploded schematic diagram of an embodiment of the secondary battery of the present application.

In some embodiments, referring to FIG. 2, the outer package may include a housing 51 and a cover 53. The housing 51 may include a bottom plate and side plates connected to the bottom plate, and the bottom plate and the side plates enclose to form an accommodating cavity. The housing 51 has an opening communicating with the accommodating cavity, and the cover plate 53 can cover the opening to enclose the accommodating cavity. The cathode plate, the anode plate, and the separator can be formed into an electrode assembly 52 through a winding process or a lamination process. The electrode assembly 52 is packaged in the accommodating cavity. Electrolyte is infiltrated in the electrode assembly 52. The number of electrode assemblies 52 contained in the secondary battery 5 can be one or more, which may be selected by those skilled in the art according to specific actual needs.

In some embodiments, the secondary battery can also be a battery module assembled from a plurality of battery cells. The number of secondary battery cells contained in the battery module can be multiple, and the specific number can be adjusted according to the application and capacity of the battery module.

Figure 3:
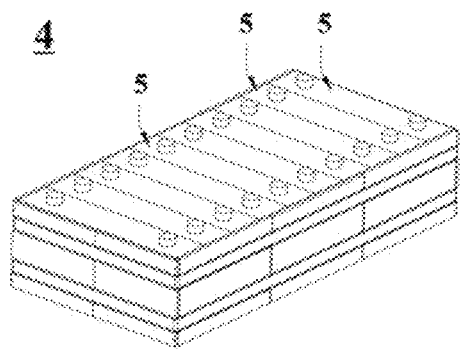
FIG. 3 is a schematic diagram of another embodiment of the secondary battery of the present application.

FIG. 3 is an exemplary battery module 4. Referring to FIG. 3, in the battery module 4, a plurality of secondary batteries 5 may be arranged in sequence along a length direction of the battery module 4. It can be understood any other arrangement manners can also be adopted. Furthermore, the plurality of secondary batteries 5 may be fixed by fasteners.

Optionally, the battery module 4 may further include a case having an accommodation space, in which a plurality of secondary batteries 5 are accommodated.

In some embodiments, the battery modules can also be assembled into a battery pack, and the number of battery modules contained in the battery pack can be adjusted according to the application and capacity of the battery pack.

In some embodiments, the above battery cells can also be directly assembled into a battery pack, and the number of battery cells contained in the battery pack can be adjusted according to the application and capacity of the battery pack.

Figure 4:
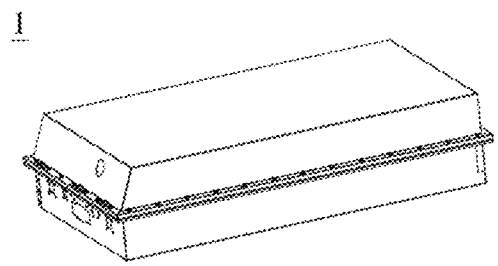
FIG. 4 is a schematic diagram of still another embodiment of the secondary battery of the present application.
Figure 5:
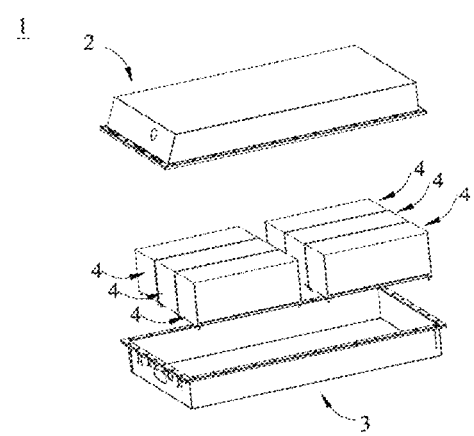
FIG. 5 is an exploded view of FIG. 4.

FIGS. 4-5 show an exemplary battery pack 1. Referring to FIGS. 4-5, the battery pack 1 may include a battery case and a plurality of battery modules 4 disposed in the battery case.

The battery case includes an upper case 2 and a lower case 3, the upper case 2 can cover the lower case 3 and form an enclosed space for accommodating the battery modules 4. The plurality of battery modules 4 can be arranged in the battery case in any manner.

Electrical Device

A fifth aspect of the embodiments of the present application provides an electrical device, the device comprising at least one of a secondary battery, a battery module, or a battery pack of the present application. The secondary battery, the battery module, or the battery pack can be used as a power source of the device, and can also be used as an energy storage unit of the electrical device. The electrical device may be, but is not limited to, mobile devices, electric vehicles, electric trains, ships and satellites, energy storage systems, and the like. For example, the electrical device can be laptops, pen input computers, mobile computers, e-book players, portable phones, portable fax machines, portable copiers, portable printers, headphones, video recorders, LCD TVs, portable cleaners, portable CDs, mini CDs, transceivers, electronic notebooks, calculators, memory cards, portable recorders, radios, backup power supplies, motors, cars, motorcycles, power assisted bicycles, bicycles, lighting fixtures, toys, game consoles, clocks, electric tools, flashlights, cameras, large household batteries, and the like.

The electrical device can select a secondary battery, a battery module, or a battery pack according to its usage requirements.

Figure 6:
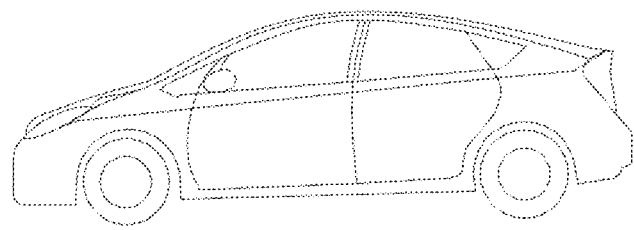
FIG. 6 is a schematic diagram of an embodiment of an electrical device using a secondary battery as a power source of the present application.

FIG. 6 is an exemplary electrical device. The electrical device is a pure electric vehicle, a hybrid electric vehicle, or a plug-in hybrid electric vehicle. To meet the high power and high energy density requirements of the electrical device, battery packs or battery modules can be employed.

EXAMPLES

The following examples describe the present disclosure more specifically, and these examples are for illustrative purposes only, since various modifications and changes within the scope of the present disclosure will be apparent to those skilled in the art. Unless otherwise specified, all parts, percentages, and ratios mentioned in the following examples are based on weight, and all reagents used in the examples are commercially available or synthesized according to conventional methods, and can be used directly without further processing, and the instruments used in the examples are all commercially available.

Example 1

Preparation of Composite Conductive Agent (1) sodium hydroxide solution (10% by weight) was slowly added dropwise to an aqueous solution of acrylic acid having a concentration of 15% by weight, while stirring the solution, until a pH value of the solution was 7.5. Thereafter, a resulting solution was distilled and dried to obtain sodium acrylate particles.

(2) Polyethylene glycol and acrylic acid were added in distilled water at a molar ratio of 2:1 to prepare a solution having a concentration of 20% by weight, 5% by weight of toluenesulfonic acid and 3% by weight of hydroquinone were added, stirred evenly and heated to 70° C. to obtain an aqueous solution of polyethylene glycol monoacrylate.

(3) The product obtained in step (2) was dissolved in dichloromethane, washed with a 5% by weight of sodium hydroxide solvent, performed with liquid separation to remove an aqueous solution, then washed with a saturated sodium chloride solution, performed with liquid separation again to remove excess polyether substances, and finally distilled to remove the solvent to obtain a polyethylene glycol monoacrylate.

(4) Sodium dodecylsulfonate, acrylic acid, and sodium acrylate obtained in step (1) were added to redistilled water according to concentrations of 3% by weight, 20% by weight, and 10% by weight, respectively, to obtain an aqueous solution. After that, hydroxylated CNT (having a concentration of 5% by weight) was added to the aqueous solution, and uniformly stirred and heated to a temperature of 70° C.

(5) Potassium sulfate having a concentration of 2% by weight was added to a resulting product obtained in step (4), and polyethylene glycol monoacrylate (30% by weight) prepared in step (3) and acrylonitrile (15% by weight) were uniformly added simultaneously, while being heated to 70° C. and continuously stirred for 2 hrs to 3 hrs. During the reaction process, the reagents could be slowly added in equal proportions. A resulting reacted solution was centrifuged, washed to remove a supernatant, so as to obtain a composite conductive agent as a target product.

Preparation of Cathode Plate

The cathode active material NCM, the conductive agent acetylene black, and the binder polyvinylidene fluoride (PVDF) were dissolved in a solvent N-methylpyrrolidone (NMP) at a weight ratio of 96.5:1.5:2, and fully stirred and mixed to yield a cathode slurry. Then, the cathode slurry was evenly coated on a cathode current collector, and then dried, cold pressed, and cut to obtain the cathode plate.

Preparation of Anode Plate

The active material graphite, silicon, conductive agent acetylene black, composite conductive agent, thickener sodium carboxymethylcellulose (CMC), and binder (SBR) were dissolved in deionized water as a solvent in a weight ratio of 90:5:1:2:1, mixed evenly with deionized water to prepare an anode slurry, and the anode slurry was coated on a copper foil. The resulting copper foil was dried, cold-pressed, and cut to obtain an anode plate.

Preparation of Electrolyte

Ethylene carbonate (EC), ethyl methyl carbonate (EMC), and diethyl carbonate (DEC) were mixed at a volume ratio of 1:1:1 to obtain an organic solvent, to which, $LiPF_6$ was dissolved and then fluoroethylene carbonate (FEC) were added to mixed uniformly to obtain an electrolyte. The concentration of $LiPF_6$ was 1 mol/L.

Preparation of Separator

A PE porous film was used as a separator.

Preparation of Lithium-Ion Batteries

The cathode plate, the separator, and the anode plate were stacked in sequence, to enable the separator to be disposed between the cathode and anode plates to play the role of isolation, then winded up to obtain a bare battery cell. The bare battery cell was welded with tabs, and then placed into an aluminum shell, and baked at 80° C. to remove water, then the aluminum shell was injected with the electrolyte and sealed to obtain an uncharged battery. The uncharged battery was then stood, and performed with hot and cold pressing, formation, shaping, capacity testing and other processes in order to obtain a lithium-ion battery.

Examples 2 to 25

The preparation method of the lithium-ion battery was similar to that of Example 1, except that the composite conductive agent and related parameters in the preparation process were adjusted, and the specific parameters were shown in Table 1 below, in which, "/" indicated that there was no corresponding parameter.

The anode plate of Example 24 included the conventional conductive agent acetylene black and the composite conductive agent, but did not include the conventional binder SBR. The anode plate of Example 25 included the conventional binder SBR and the composite conductive agent, but did not include the conventional conductive agent acetylene black.

Comparative Example 1

In the anode plate of Comparative Example 1, the carbon nanotube was used instead of the composite conductive agent.

Comparative Example 2

The preparation method of the composite conductive agent in Comparative Example 2 was similar to that of Example 1, except that no hydroxylated carbon nanotube was added in the preparation process, and the carbon nanotube was used instead of the conductive agent acetylene black in the anode plate.

Comparative Example 3

The preparation method of the composite conductive agent in Comparative Example 3 was similar to that of Example 1, except that no hydroxylated carbon nanotubes are added in the preparation process.

Comparative Example 4

The preparation method of the composite conductive agent in Comparative Example 4 was similar to that of Example 1, except that the amount of hydroxylated carbon nanotube in the preparation process was excessive.

Test Part (1) Machinability Test of Slurry or Electrode Plate

Stability test of slurry: an appropriate amount of a stirred slurry was placed in a beaker, and sealed with a plastic wrap, after standing for 24 hrs, the sedimentation or gelation of the slurry was examined as follows: the plastic wrap was opened, a surface of the slurry was gently plucked with a steel ruler, and it was examined whether there is any abnormality on the surface of the slurry; and the steel ruler was slowly extended vertically along an edge of the beaker to the bottom of the beaker, the slurry at the bottom was scraped, and then the steel ruler was pulled out to examine the precipitation brought out by the steel ruler.

Bonding property test of electrode plate: the electrode plate to be tested was taken and cut to obtain a sample having suitable width and length using a blade. A special double-sided tape was stuck on a steel plate, and a width of the tape should be fixed. The cut electrode plate sample was pasted on the double-sided tape with a test side facing downward, compacted with a pressure roller, and then a tensile machine was used to test a force corresponding to a maximum peel strength, which was converted to a unit of N/m according to the width of the tape.

Toughness of electrode plate: an appropriate amount of cold-pressed electrode plate samples were taken, folded in half along a transverse direction (TD), and placed on a plane of a test bench, rolled once by a 2 kg cylindrical roller. Thereafter, each sample was folded back once according to the former operation, and it was checked whether light transmission or breakage occurred at the crease, if the light transmission or breakage occurred, then the sample was indicated as NG; if no light transmission or breakage occurred, the above test operations were repeated, and the light transmission was checked again. The toughness was added by 1 each time the light transmission examination was passed. In this way, a maximum number of times of the non-NG toughness was recorded.

(2) Cycle Life Test of Lithium-Ion Battery

The cycle test was performed at a temperature of 25° C. The battery was charged to an upper limit voltage at a constant current at 0.33 C, and charged to 0.05 C at a constant voltage, and discharged to a lower limit voltage at 0.33 C after standing for 5 mins. The capacity obtained in this step was used as an initial capacity. The battery was performed with a charge at 0.33 C/discharge at 0.33 C cycle test, until the capacity decayed to 80% SOH, then, a corresponding number of cycles was recorded and corresponding life data were obtained.

(3) Expansion Force Test of Battery Cell

Before the above test (2), the battery cell was fixed in a clamp of a pressure sensor, clamped with a fixed pressure, then performed with the capacity calibration and the cycle test according to the operations in test (2). During the cycle process, the expansion force change was monitored. A ratio of an expansion force increment to an initial expansion force when the capacity decays to 80% was the expansion force change.

(4) Kinetic Performance Test of Lithium-Ion Battery

DC resistance (DCR) test: the battery cell was charged to a nominal voltage at 0.33 C, then charged at a constant voltage until the current was ≤0.05 C, and capacity in such condition was recorded as 100% SOC. After leaving for 5 mins, the battery cell was discharged to a capacity of 50% SOC at a constant current at a rate of 0.33 C. After the adjustment, the voltage of the lithium-ion battery was tested and recorded as V1. The battery cell was continued to discharge at a constant current at a rate of 4 C (denoted as: I) for 10 s, after the discharge, the voltage of the lithium-ion battery was tested and recorded as V2; and the following formula was used to calculate the DC resistance: DCR= (V1−V2)/I.

Table 2 below shows the performance test results of Examples 1 to 24 and Comparative Examples 1 to 4.

Through the comparison of the examples and comparative examples, it can be seen that the composite conductive agent obtained by combining the organic polymer with the hydroxylated carbon nanotubes can effectively improve the machinability of the electrode plate, reduce the expansion force of the battery cell, and improve the cycle life and kinetic performance of the lithium-ion battery. By controlling the relevant condition parameters in the preparation process of the composite conductive agent, the adjustment of the performance of the electrode plate, the battery cell and the lithium-ion battery can be realized, so that the lithium-ion battery with better comprehensive performance can be obtained according to the actual application requirements.

The technical features of the above-mentioned examples can be combined arbitrarily. To make the description concise, all possible combinations of the technical features in the above-mentioned examples are not described. However, as long as there is no contradiction in the combination of these technical features, they should be considered as within the scope of this specification.

The above is only a specific example of the application, but the protection scope of the application is not limited thereto. Any person familiar with the technical field can easily think of various equivalent modifications or replacements within the technical scope disclosed in the present application, and these modifications or replacements should be covered within the protection scope of the present application. Therefore, the protection scope of the present application should be based on the protection scope of the claims, and the specification and drawings can be used to explain the protection scope of the claims.

TABLE 1

| | Preparation parameters | | | | | | | | | |
|---|---|---|---|---|---|---|---|---|---|---|
| | | Esterification reaction | | | | Prepolymerization reaction | | | | |
| | Salification reaction Type of alkaline reagent | pH value of solution | Type of polyether polyol | Molar ratio of acrylic acid to polyether polyol | Temperature of third heat treatment (° C.) | Type of acrylate | Weight percentage content of acrylate (%) | Weight percentage content of acrylic acid (%) | Weight percentage content of hydroxylated carbon nanotube (%) | Temperature of first heat treatment (° C.) |
| Example 1 | sodium hydroxide | 7.5 | polyethylene glycol | 2:1 | 70 | sodium acrylate | 10 | 20 | 5 | 70 |
| Example 2 | ammonia water | 7.5 | polyethylene glycol | 2:1 | 70 | Ammonium acrylate | 10 | 20 | 5 | 70 |
| Example 3 | lithium hydroxide | 7.5 | polyethylene glycol | 2:1 | 70 | lithium acrylate | 10 | 20 | 5 | 70 |
| Example 4 | sodium hydroxide | 7 | polyethylene glycol | 2:1 | 70 | sodium acrylate | 10 | 20 | 5 | 70 |
| Example 5 | sodium hydroxide | 8 | polyethylene glycol | 2:1 | 70 | sodium acrylate | 10 | 20 | 5 | 70 |
| Example 6 | sodium hydroxide | 7.5 | Polypropylene glycol | 2:1 | 70 | sodium acrylate | 10 | 20 | 5 | 70 |
| Example 7 | sodium hydroxide | 7.5 | polytetrahydro-furan glycol | 2:1 | 70 | sodium acrylate | 10 | 20 | 5 | 70 |
| Example 8 | sodium hydroxide | 7.5 | polyethylene glycol | 5:1 | 70 | sodium acrylate | 10 | 20 | 5 | 70 |
| Example 9 | sodium hydroxide | 7.5 | polyethylene glycol | 1:1 | 70 | sodium acrylate | 10 | 20 | 5 | 70 |
| Example 10 | sodium hydroxide | 7.5 | polyethylene glycol | 2:1 | 70 | sodium acrylate | 3 | 20 | 5 | 70 |
| Example 11 | sodium hydroxide | 7.5 | polyethylene glycol | 2:1 | 70 | sodium acrylate | 25 | 20 | 5 | 70 |
| Example 12 | sodium hydroxide | 7.5 | polyethylene glycol | 2:1 | 70 | sodium acrylate | 10 | 5 | 5 | 70 |
| Example 13 | sodium hydroxide | 7.5 | polyethylene glycol | 2:1 | 70 | sodium acrylate | 10 | 40 | 5 | 70 |
| Example 14 | sodium hydroxide | 7.5 | polyethylene glycol | 2:1 | 70 | sodium acrylate | 10 | 20 | 1 | 70 |
| Example 15 | sodium hydroxide | 7.5 | polyethylene glycol | 2:1 | 70 | sodium acrylate | 10 | 20 | 10 | 70 |
| Example 16 | sodium hydroxide | 7.5 | polyethylene glycol | 2:1 | 70 | sodium acrylate | 10 | 20 | 5 | 50 |
| Example 17 | sodium hydroxide | 7.5 | polyethylene glycol | 2:1 | 70 | sodium acrylate | 10 | 20 | 5 | 85 |
| Example 18 | sodium hydroxide | 7.5 | polyethylene glycol | 2:1 | 70 | sodium acrylate | 10 | 20 | 5 | 70 |
| Example 19 | sodium hydroxide | 7.5 | polyethylene glycol | 2:1 | 70 | sodium acrylate | 10 | 20 | 5 | 70 |
| Example 20 | sodium hydroxide | 7.5 | polyethylene glycol | 2:1 | 70 | sodium acrylate | 10 | 20 | 5 | 70 |
| Example 21 | sodium hydroxide | 7.5 | polyethylene glycol | 2:1 | 70 | sodium acrylate | 10 | 20 | 5 | 70 |
| Example 22 | sodium hydroxide | 7.5 | polyethylene glycol | 2:1 | 70 | sodium acrylate | 10 | 20 | 5 | 70 |
| Example 23 | sodium hydroxide | 7.5 | polyethylene glycol | 2:1 | 70 | sodium acrylate | 10 | 20 | 5 | 70 |
| Example 24 | sodium hydroxide | 7.5 | polyethylene glycol | 2:1 | 70 | sodium acrylate | 10 | 20 | 5 | 70 |
| Example 25 | sodium hydroxide | 7.5 | polyethylene glycol | 2:1 | 70 | sodium acrylate | 10 | 20 | 5 | 70 |
| Comparative Example 1 | / | / | / | / | / | / | / | / | / | / |
| Comparative Example 2 | sodium hydroxide | 7.5 | polyethylene glycol | 2:1 | 70 | sodium acrylate | 10 | 20 | 0% | 70 |
| Comparative Example 3 | sodium hydroxide | 7.5 | polyethylene glycol | 2:1 | 70 | sodium acrylate | 10 | 20 | 0% | 70 |
| Comparative Example 4 | sodium hydroxide | 7.5 | polyethylene glycol | 2:1 | 70 | sodium acrylate | 10 | 20 | 15% | 70 |

TABLE 1-continued

| | Preparation parameters Polymerization reaction | | | Composite conductive agent | | | | | |
|---|---|---|---|---|---|---|---|---|---|
| | | Weight | | | | | | | Weight |
| | | percentage | Weight | Temperature | | | | | percentage |
| | Type of | content of | percentage | of second | | | | | content of |
| | polyether | polyol | content of | heat | | | | | organic |
| | polyol | monoacrylate | acrylonitrile | treatment | Polymerization degree | | | | polymer |
| | monoacrylate | (%) | (%) | (° C.) | m | p | q | f | n | (%) |
| Example 1 | polyethylene glycol monoacrylate | 30 | 15 | 70 | ~10000 | ~2500 | ~5000 | ~2500 | ~100 | 70 |
| Example 2 | polyethylene glycol monoacrylate | 30 | 15 | 70 | ~10000 | ~2500 | ~5000 | ~2500 | ~100 | 70 |
| Example 3 | polyethylene glycol monoacrylate | 30 | 15 | 70 | ~11000 | ~2500 | ~5000 | ~2500 | ~100 | 70 |
| Example 4 | polyethylene glycol monoacrylate | 30 | 15 | 70 | ~10000 | ~2500 | ~5000 | ~2500 | ~100 | 70 |
| Example 5 | polyethylene glycol monoacrylate | 30 | 15 | 70 | ~10000 | ~2500 | ~5000 | ~2500 | ~100 | 70 |
| Example 6 | polypropylene glycol monoacrylate | 30 | 15 | 70 | ~10000 | ~2500 | ~5000 | ~2500 | ~100 | 70 |
| Example 7 | polytetrahydrofuran glycol monoacrylate | 30 | 15 | 70 | ~10000 | ~2500 | ~5000 | ~2500 | ~100 | 70 |
| Example 8 | polyethylene glycol monoacrylate | 30 | 15 | 70 | ~12000 | ~2500 | ~5000 | ~1000 | ~100 | 70 |
| Example 9 | polyethylene glycol monoacrylate | 30 | 15 | 70 | ~8000 | ~2500 | ~5000 | ~3000 | ~100 | 70 |
| Example 10 | polyethylene glycol monoacrylate | 30 | 15 | 70 | ~10000 | ~2500 | ~1000 | ~2500 | ~100 | 70 |
| Example 11 | polyethylene glycol monoacrylate | 30 | 15 | 70 | ~10000 | ~2500 | ~15000 | ~2500 | ~100 | 70 |
| Example 12 | polyethylene glycol monoacrylate | 30 | 15 | 70 | ~2500 | ~2500 | ~5000 | ~2500 | ~100 | 70 |
| Example 13 | polyethylene glycol monoacrylate | 30 | 15 | 70 | ~20000 | ~2500 | ~5000 | ~2500 | ~100 | 70 |
| Example 14 | polyethylene glycol monoacrylate | 30 | 15 | 70 | ~10000 | ~2500 | ~5000 | ~2500 | ~100 | 90 |
| Example 15 | polyethylene glycol monoacrylate | 30 | 15 | 70 | ~10000 | ~2500 | ~5000 | ~2500 | ~100 | 50 |
| Example 16 | polyethylene glycol monoacrylate | 30 | 15 | 70 | ~8000 | ~2200 | ~5000 | ~2500 | ~100 | 70 |
| Example 17 | polyethylene glycol monoacrylate | 30 | 15 | 70 | ~10000 | ~2500 | ~5000 | ~2500 | ~100 | 70 |
| Example 18 | polyethylene glycol monoacrylate | 10 | 15 | 70 | ~10000 | ~2500 | ~5000 | ~500 | ~100 | 70 |
| Example 19 | polyethylene glycol monoacrylate | 40 | 15 | 70 | ~10000 | ~2500 | ~5000 | ~4000 | ~100 | 70 |
| Example 20 | polyethylene glycol monoacrylate | 30 | 5 | 70 | ~10000 | ~1000 | ~5000 | ~2500 | ~100 | 70 |
| Example 21 | polyethylene glycol monoacrylate | 30 | 30 | 70 | ~10000 | ~5000 | ~5000 | ~2500 | ~100 | 70 |

TABLE 1-continued

|  |  |  |  |  |  |  |  |  |  |  |
|---|---|---|---|---|---|---|---|---|---|---|
| Example 22 | polyethylene glycol monoacrylate | 30 | 15 | 50 | ~10000 | ~2000 | ~5000 | ~2000 | ~100 | 70 |
| Example 23 | polyethylene glycol monoacrylate | 30 | 15 | 85 | ~10000 | ~2500 | ~5000 | ~2500 | ~100 | 70 |
| Example 24 | polyethylene glycol monoacrylate | 30 | 15 | 70 | ~10000 | ~2500 | ~5000 | ~2500 | ~2 | 70 |
| Example 25 | polyethylene glycol monoacrylate | 30 | 15 | 70 | ~10000 | ~2500 | ~5000 | ~2500 | ~200 | 70 |
| Comparative Example 1 | / | / | / | / | / | / | / | / | / | / |
| Comparative Example 2 | polyethylene glycol monoacrylate | 30 | 15 | 70 | ~10000 | ~2500 | ~5000 | ~2500 | ~100 | 100 |
| Comparative Example 3 | polyethylene glycol monoacrylate | 30 | 15 | 70 | ~10000 | ~2500 | ~5000 | ~2500 | ~100 | 100 |
| Comparative Example 4 | polyethylene glycol monoacrylate | 30 | 15 | 70 | ~10000 | ~2500 | ~5000 | ~2500 | ~100 | 40 |

TABLE 2

|  | Stability of slurry | Bonding property of electrode plate (N/m) | Toughness of electrode plate | DCR (Ω) | Cycle life of battery (cycles) | Expansion force change of battery cell (%) |
|---|---|---|---|---|---|---|
| Example 1 | stable without sedimentation | 18 | light transmitted after 4 times folding | 1.2 | 2600 | 400 |
| Example 2 | stable without sedimentation | 16 | light transmitted after 4 times folding | 1.2 | 2000 | 620 |
| Example 3 | stable without sedimentation | 17.5 | light transmitted after 4 times folding | 1.15 | 2500 | 413 |
| Example 4 | stable without sedimentation | 18.5 | light transmitted after 3 times folding | 1.25 | 2400 | 400 |
| Example 5 | stable without sedimentation | 16 | light transmitted after 4 times folding | 1 | 2500 | 410 |
| Example 6 | stable without sedimentation | 16 | light transmitted after 5 times folding | 1.25 | 2600 | 423 |
| Example 7 | stable without sedimentation | 15 | light transmitted after 5 times folding | 1.27 | 2300 | 433 |
| Example 8 | stable without sedimentation | 18 | light transmitted after 3 times folding | 1.15 | 2400 | 410 |
| Example 9 | stable without sedimentation | 17.5 | light transmitted after 5 times folding | 1.35 | 2500 | 470 |
| Example 10 | Slight gelation and sedimentation | 17 | light transmitted after 4 times folding | 1.35 | 2300 | 410 |

TABLE 2-continued

|  | Stability of slurry | Bonding property of electrode plate (N/m) | Toughness of electrode plate | DCR (Ω) | Cycle life of battery (cycles) | Expansion force change of battery cell (%) |
|---|---|---|---|---|---|---|
| Example 11 | stable without sedimentation | 16 | light transmitted after 4 times folding | 1.25 | 2300 | 430 |
| Example 12 | stable without sedimentation | 13 | light transmitted after 5 times folding | 1.15 | 2300 | 450 |
| Example 13 | stable without sedimentation | 19.5 | light transmitted after 3 times folding | 1.32 | 2500 | 380 |
| Example 14 | stable without sedimentation | 18 | light transmitted after 4 times folding | 1.35 | 2200 | 375 |
| Example 15 | Slight gelation in surface layer | 16.5 | light transmitted after 4 times folding | 1.1 | 2400 | 435 |
| Example 16 | stable without sedimentation | 12 | light transmitted after 4 times folding | 1.45 | 2400 | 445 |
| Example 17 | stable without sedimentation | 18 | light transmitted after 4 times folding | 1.2 | 2600 | 400 |
| Example 18 | stable without sedimentation | 18 | light transmitted after 2 times folding | 1.25 | 2500 | 390 |
| Example 19 | stable without sedimentation | 16.5 | light transmitted after 6 times folding | 1.27 | 2400 | 515 |
| Example 20 | stable without sedimentation | 12.5 | light transmitted after 4 times folding | 1.3 | 2500 | 434 |
| Example 21 | stable without sedimentation | 18.5 | light transmitted after 3 times folding | 1.25 | 2500 | 380 |
| Example 22 | stable without sedimentation | 15.5 | light transmitted after 3 times folding | 1.2 | 2500 | 460 |
| Example 23 | stable without sedimentation | 18 | light transmitted after 4 times folding | 1.2 | 2600 | 400% |
| Example 24 | stable without sedimentation | 18 | light transmitted after 2 times folding | 1.15 | 2500 | 385 |
| Example 25 | stable without sedimentation | 17 | light transmitted after 6 times folding | 1.45 | 2300 | 470 |
| Comparative Example 1 | Gelation in surface of slurry, sedimentation in bottom of slurry | 7.5 | light transmitted after 3 times folding | 1.57 | 2100 | 670 |
| Comparative Example 2 | slurry gelation | 17.5 | light transmitted after 4 times folding | 1.25 | 2400 | 415 |

TABLE 2-continued

|  | Stability of slurry | Bonding property of electrode plate (N/m) | Toughness of electrode plate | DCR (Ω) | Cycle life of battery (cycles) | Expansion force change of battery cell (%) |
|---|---|---|---|---|---|---|
| Comparative Example 3 | stable without sedimentation | 17.5 | light transmitted after 4 times folding | 1.68 | 2300 | 420 |
| Comparative Example 4 | slurry gelation | 16 | light transmitted after 4 times folding | 1.05 | 2500 | 405 |

What is claimed is:

1. A composite conductive agent, comprising:
an organic polymer, and
a hydroxylated carbon nanotube combined with the organic polymer;
wherein:
the organic polymer comprises a polymer having a structural formula represented by formula (1),

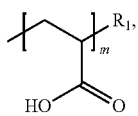

(1)

in the formula (1), m is an integer ranging from 2500 to 20000, and $R_1$ is a polymer structure comprising an ester group and a nitrile group; and
the polymer structure comprises a polymer structure having a structural formula represented by formula (2),

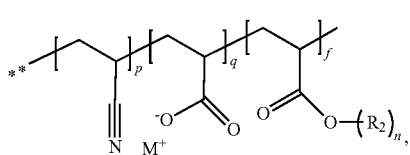

(2)

in the formula (2), ** represents a connection site of the polymer structure, p is an integer ranging from 1000 to 5000, q is an integer ranging from 1000 to 15000, f is an integer ranging from 500 to 4000, $2 \leq n \leq 200$, each $R_2$ is independently one selected from

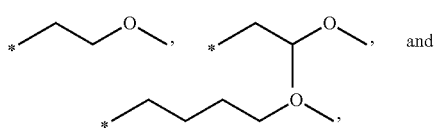

represents a connection site of $R_2$, and $M^+$ is one selected from $Na^+$, $K^+$, $Li^+$ and $NH_4^+$.

2. The composite conductive agent according to claim 1, wherein the composite conductive agent satisfies at least one of following conditions:
(1) the hydroxylated carbon nanotube is combined with the organic polymer through an ester group and/or a hydrogen bond; and
(2) at least one hydroxyl group is attached to a surface of the hydroxylated carbon nanotube.

3. The composite conductive agent according to claim 1, wherein the composite conductive agent satisfies at least one of following conditions:
(1) in the composite conductive agent, a weight percentage content of the organic polymer is 50% to 90%; and
(2) the hydroxylated carbon nanotube comprises a hydroxylated single-walled carbon nanotube and/or a hydroxylated multi-walled carbon nanotube.

4. A method for preparing the composite conductive agent according to claim 1, comprising:
enabling acrylate and acrylic acid to react with the hydroxylated carbon nanotube to obtain a pre-reacted mixture; and
polymerizing the pre-reacted mixture with acrylonitrile and a polyether polyol monoacrylate to form the organic polymer combined with the hydroxylated carbon nanotube, thereby obtaining the composite conductive agent.

5. The method according to claim 4, wherein enabling the acrylate and the acrylic acid to react with the hydroxylated carbon nanotube comprises:
contacting the acrylate and the acrylic acid with the hydroxylated carbon nanotube for reaction, under action of a polymerization aid.

6. The method according to claim 5, wherein the method satisfies at least one of following conditions:
(1) the acrylate comprises at least one of sodium acrylate, potassium acrylate, lithium acrylate, and ammonium acrylate; and
(2) the polymerization aid comprises sodium dodecylsulfonate and/or sodium dodecylsulfate.

7. The method according to claim 5, wherein contacting the acrylate and the acrylic acid with the hydroxylated carbon nanotube for reaction, under the action of the polymerization aid comprises:
contacting and mixing the polymerization aid, the acrylate, the acrylic acid, with the hydroxylated carbon nanotube in water to form a mixed solution; and
performing a heat treatment on the mixed solution, to subject the acrylate, the acrylic acid, and the hydroxylated carbon nanotube with a prepolymerization reaction.

8. The method according to claim 7, wherein the method satisfies at least one of following conditions:
(1) in the mixed solution, a weight percentage content of the acrylate is 3% to 25%;
(2) in the mixed solution, a weight percentage content of the acrylic acid is 5% to 40%;
(3) in the mixed solution, a weight percentage content of the hydroxylated carbon nanotube is 1% to 10%;

(4) in the mixed solution, a weight percentage content of the polymerization aid is 2% to 5%; and (5) a temperature of the heat treatment is 50° C. to 85° C.

9. The method according to claim 4, wherein polymerizing the pre-reacted mixture with the acrylonitrile and the polyether polyol monoacrylate comprises:

contacting and polymerizing the pre-reacted mixture with the acrylonitrile and the polyether polyol monoacrylate, under action of a polymerization initiator, to form the polymer structure.

10. The method according to claim 9, wherein the method satisfies at least one of following conditions:

(1) the polyether polyol monoacrylate comprises at least one of a polyethylene glycol acrylate, a polypropylene glycol acrylate, and a polytetrahydrofuran glycol acrylate; and (2) the polymerization initiator comprises at least one of potassium sulfate, potassium persulfate, and sodium persulfate.

11. The method according to claim 9, wherein the step of contacting and polymerizing the pre-reacted mixture with the acrylonitrile and the polyether polyol monoacrylate under the action of the polymerization initiator comprises:

contacting and mixing the polymerization initiator, the acrylonitrile, and the polyether polyol monoacrylate in a solution of the pre-reacted mixture to obtain a mixed solution; and performing a heat treatment on the mixed solution, to subject the acrylonitrile, the polyether polyol monoacrylate, and the pre-reacted mixture with a polymerization reaction.

12. The method according to claim 11, wherein the method satisfies at least one of the following conditions:

(1) in the mixed solution, a weight percentage content of the polymerization initiator is 1% to 3%;

(2) in the mixed solution, a weight percentage content of the acrylonitrile is 5% to 30%;

(3) in the mixed solution, a weight percentage content of the polyether polyol monoacrylate is 10% to 40%; and (4) a temperature of the heat treatment is 50° C. to 85° C.

13. The method according to claim 4, further comprising:

preparing the polyether polyol monoacrylate, comprising contacting acrylic acid with a polyether polyol for esterification reaction, whereby obtaining the polyether polyol monoacrylate.

14. The method according to claim 13, wherein the method satisfies at least one of following conditions:

(1) the polyether polyol comprises at least one of a polyethylene glycol, a polypropylene glycol, and a polytetrahydrofuran glycol; and (2) a polymerization degree of the polyether polyol is 2 to 200.

15. The method according to claim 13, wherein contacting the acrylic acid with the polyether polyol for esterification reaction comprises:

contacting and mixing the acrylic acid and the polyether polyol in water to form a mixed solution; and performing a heat treatment on the mixed solution to obtain a solution of the polyether polyol monoacrylate.

16. The method according to claim 15, wherein the method satisfies at least one of following conditions:

(1) a molar ratio of the acrylic acid to the polyether polyol is (5:1) to (1:1); and (2) a temperature of the heat treatment is 50° C. to 85° C.

17. The method according to claim 15, further comprising, before performing the heat treatment on the mixed solution:

adding a catalyst and a polymerization inhibitor to the third mixed solution.

18. The method according to claim 17, wherein the method satisfies at least one of following conditions:

(1) in the mixed solution, a weight percentage content of the catalyst is 3% to 10%; and (2) in the mixed solution, a weight percentage content of the polymerization inhibitor is 1% to 5%.

19. The method according to claim 15, further comprising, after performing the heat treatment on the mixed solution:

purifying the solution of the polyether polyol monoacrylate to obtain the polyether polyol monoacrylate.

* * * * *